United States Patent
Tsukishima et al.

(10) Patent No.: US 7,912,087 B2
(45) Date of Patent: Mar. 22, 2011

(54) CAPACITY VARIABLE LINK APPARATUS AND CAPACITY VARIABLE LINK SETTING METHOD

(75) Inventors: Yukio Tsukishima, Yokohama (JP); Tetsuo Takahashi, Yokohama (JP); Atsushi Watanabe, Yokohama (JP); Yasutaka Okazaki, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1424 days.

(21) Appl. No.: 10/347,339

(22) Filed: Jan. 21, 2003

(65) Prior Publication Data

US 2003/0137937 A1 Jul. 24, 2003

(30) Foreign Application Priority Data

Jan. 22, 2002 (JP) ................. 2002-013432
Feb. 28, 2002 (JP) ................. 2002-054559

(51) Int. Cl.
*H04J 3/16* (2006.01)
*H04J 3/24* (2006.01)
*H04J 3/04* (2006.01)
*G01R 31/08* (2006.01)

(52) U.S. Cl. ........ 370/468; 370/230; 370/235; 370/474; 370/536

(58) Field of Classification Search .................. None
See application file for complete search history.

(56) References Cited

U.S. PATENT DOCUMENTS

| | | | |
|---|---|---|---|
| 5,157,660 A * | 10/1992 | Kuwahara et al. ............. 370/314 |
| 5,771,229 A | 6/1998 | Gavrilovich | |
| 5,970,067 A | 10/1999 | Sathe et al. | |
| 6,084,858 A * | 7/2000 | Matthews et al. .............. 370/238 |
| 6,445,715 B1 * | 9/2002 | Annaamalai et al. .......... 370/466 |
| 6,594,279 B1 * | 7/2003 | Nguyen et al. ................. 370/468 |
| 6,665,497 B1 * | 12/2003 | Hamilton-Gahart et al. . 398/135 |
| 6,731,639 B1 * | 5/2004 | Ors et al. .................. 370/395.51 |
| 6,731,876 B1 * | 5/2004 | Okamoto et al. ............... 398/75 |

(Continued)

FOREIGN PATENT DOCUMENTS

JP 2000-295227 10/2000

(Continued)

OTHER PUBLICATIONS

Y. Tsukishima, et al., IEICE, 1 page, "Virtually Concatenated Optical Path Capacity Adjustment Scheme(VCOP-CAS)", Mar. 28, 2002.

(Continued)

*Primary Examiner* — Kwang B Yao
*Assistant Examiner* — Jutai Kao
(74) *Attorney, Agent, or Firm* — Oblon, Spivak, McClelland, Maier & Neustadt, L.L.P.

(57) ABSTRACT

A capacity variable link apparatus including a main signal system and a control signal system is provided. The main signal system includes: an upper layer signal accommodation part; a lower layer path termination part; and a signal switching part for dividing the upper layer signal to lower layer signals in a lower layer path group having a capacity that is determined according to an amount of traffic of the upper layer signal. The control system includes: a traffic amount measuring part for measuring the amount of traffic of the upper layer and for determining whether the capacity of the lower layer path group is to be increased or decreased according to the amount; and a signal switching management part for controlling the signal switching part according to the result of the determination.

21 Claims, 30 Drawing Sheets

U.S. PATENT DOCUMENTS

| | | | |
|---|---|---|---|
| 6,765,866 B1 * | 7/2004 | Wyatt | 370/229 |
| 6,842,455 B1 * | 1/2005 | Heuer | 370/393 |
| 6,968,379 B2 * | 11/2005 | Nielsen | 709/226 |
| 7,149,210 B2 * | 12/2006 | DeMartino | 370/353 |
| 7,171,121 B1 * | 1/2007 | Skarica et al. | 398/67 |
| 2002/0146020 A1 * | 10/2002 | Yamada et al. | 370/403 |

FOREIGN PATENT DOCUMENTS

| | | |
|---|---|---|
| JP | 2001-53706 | 2/2001 |
| JP | 2001-320420 | 11/2001 |
| JP | 2001-333045 | 11/2001 |
| JP | 2002-135308 | 5/2002 |
| WO | WO 93/13609 | 7/1993 |
| WO | WO 99/23853 | 5/1999 |

OTHER PUBLICATIONS

Y. Okazaki, et al., IEICE, 1 page, "An Evaluation of Wavelength Resource Reduction on VCOP-CAS-Based Photonic Network", Sep. 10, 2002.

Y. Okazaki, et al., Technical Report of IEICE, pp. 1-6, "The Advantage of VCOP-CAS (Virtually Concatenated Optical Path-Capacity Adjustment Scheme) for the Photonic Network", Aug. 2, 2002 (with English abstract).

K. Shimano, et al., "Virtual Concatenation on Optical Path Network", NTT Network Innovation Laboratories, Aug. 16, 1999, 3 pages and (with English Abstract).

* cited by examiner

CAPACITY VARIABLE LINK APPARATUS AND CAPACITY VARIABLE LINK SETTING METHOD

BACKGROUND OF THE INVENTION

1. Field of the Invention

The present invention relates to a technology for changing capacity of a path group of a lower layer according to the traffic in an upper layer in a hierarchical network in which a link of the upper layer is accommodated with the path group of the lower layer.

2. Description of the Related Art

As traffic of data communications such as on the Internet increases, the requirement for a large-sized large capacity network is changing. In a conventional circuit switching network, it is possible to design the capacity of paths that accommodate circuits connecting between switching nodes beforehand in consideration of the number of subscribers, so that capital investment can be planned according to demand.

In the circuit switching type network, the capacity of a link connecting nodes is always planned beforehand, and the speed of change and update of the capacity is very low. Therefore, the frequency of change of link capacity is very small. The circuit switching network infrastructure and the operation system are designed on the understanding of it.

On the other hand, in a network for data communication, there are various drastically variable factors. Some examples are establishment or retirement of an Internet service provider, remote database backup by mirroring between various servers and the like. The speed of capacity update for the circuit switching network cannot follow the change of capacity of the network for data communication. Thus, for designing a circuit switching network that accommodates a network for data communication, the capacity is determined so as to allow for future increase of capacity.

However, the network for data communication in which the traffic changes in a short period does not conform to the circuit switching network, so that it is not efficient to use the circuit switching network as a lower layer network of the network for data communication.

That is, in many cases, a network for data communication such as an IP (Internet Protocol) network and an Ethernet network uses an SDH (Synchronous Digital Hierarchy) network that is a circuit switching network as a lower layer network for transmitting traffic. In the SDH network, a start node and an end node are determined and a path is set up and fixed. Once the path is set up, a constant capacity is maintained in the network, in which changing the capacity and the route of the path takes much time, so that the frequency of the change is low.

When the IP network and the Ethernet network and the like are used as the upper layer network, and the SDH network is used as the lower layer network, the network configuration is layered and management is performed for each layer network separately. Thus, for changing the bandwidth of the network, settings must be changed not only for the network of the upper layer but also for the network of the lower layer. Thus, it takes much time to change the network configuration. Therefore, the capacity of the network of the lower layer is designed with an adequate margin. As a result, the network resources can not be used efficiently.

Recently there is a possibility that a network such as an optical cross connect network that carries traffic by each wavelength can be used as a next generation lower layer network. However, currently, setting up or tearing down a path of the optical network is performed by using the same method as that used for the conventional SDH network. Therefore, even though the next generation lower layer network is used, the capacity for the lower layer network is designed to have an adequate margin.

Recently, Generalized-MPLS (Generalized-Multiprotocol Label Switching) is being proposed in standardization organizations such as OIF/IETF and the like. The Generalized-MPLS is an expanded version of MPLS that is a connection type networking technology. In the Generalized-MPLS, the MPLS is expanded to the circuit switching layer such as ATM (Asynchronous Transfer Mode)/SDH/SONET (Synchronous Optical Network) or the optical layer. The Generalized-MPLS manages Virtual Path (VP) provided in the ATM layer, SDH path provided in the physical layer, wavelength path provided in the optical layer and optical fiber together. This technology aims to provide services flexibly by using the unified control method of the ATM apparatus, the SONET/SDH apparatus, the WDM apparatus, the optical cross connect apparatus and the fiber switch that are conventionally managed separately for each layer. In addition, the technology aims to prevent redundancy for capacity design for each layer and to provide services speedily. In the specification of OIF-UNI 1.0, it is described that policy control is applied to use of network resources by using a policy server.

However, the technologies such as the above-mentioned G-MPLS do not-have a mechanism for changing a link capacity flexibly according to amount of traffic. Therefore, even if the technologies are used, the problem that network resources are not used efficiently is not solved.

That is, G-MPLS cannot control the capacity of the lower layer network according to the change of the amount of traffic. Therefore, when a network such as an IP network and an Ethernet network is accommodated as the upper layer network, it is necessary to make allowance for future traffic increase of the upper layer network. It is necessary to forecast maximum amount of traffic in the path of the lower layer network, so that the path is set up semipermanently considering an adequate margin for the maximum future amount of traffic. Therefore, in the SDH network, it is necessary to prepare network resources having capacity much larger than the total amount of traffic actually being carried, which is inefficient from the viewpoint of use of network resources.

As mentioned above, according to the conventional technology, since the capacity of the path of the lower layer is constant, when the amount of traffic is small, a large part of resources of the lower layer is wasted. In addition, when the amount of traffic increases in a burst, the capacity of the network may become deficient so that a part of the traffic may be lost. In the G-MPLS, a mechanism is proposed in which a path is set up in the lower layer according to a request from the upper layer. However, in the mechanism, the capacity in the lower layer is not controlled proactively according to the amount of traffic of the upper layer. In addition, there is a conventional technology disclosed in Japanese laid-open patent application No.13-333045.

SUMMARY OF THE INVENTION

An object of the present invention is to provide a capacity changeable link apparatus and a capacity changeable link setting method for using network resources efficiently by changing the capacity of the lower layer path group according to the amount of traffic of the upper layer.

The above object is achieved by a capacity variable link apparatus including a main signal system and a control signal system, the main signal system including:

an upper layer signal accommodation part for accommodating an upper layer signal;

a lower layer path termination part;

a signal switching part for dividing the upper layer signal to lower layer signals in a lower layer path group having a capacity that is determined according to the amount of traffic of the upper layer signal, and passing the lower layer signals to the lower layer path termination part;

the control system including:

a traffic amount measuring part for measuring an amount of traffic that flows in the upper layer signal accommodation part, and determining whether the capacity of the lower layer path group is to be increased or decreased according to the amount; and a signal switching management part for controlling the signal switching part according to the result of determination by the traffic amount measuring part.

According to the above-mentioned apparatus, the main signal system includes the upper layer signal accommodation part and the lower layer path termination part, and includes the signal switching part between them. Therefore, accommodating positions of the upper layer signal into the lower layer paths can be controlled. In a conventional method for mapping the upper layer signal to the lower layer paths, the relationship between the upper layer signal and the lower layer paths is fixed. Thus, if the capacity of the lower layer paths is set such that maximum throughput determined by maximum traffic of the upper layer signal or Service Level agreement (SLA) contract can be accommodated, actual throughput is generally lower than the determined capacity due to traffic variation of the upper layer signal. Therefore, efficiency for using bandwidth of the lower layer paths is low. According to the above-mentioned apparatus, the capacity of the lower layer path is not set to be the future maximum, but set smaller than the maximum. Then, when the amount of traffic measured by the traffic amount measuring part is increasing, a lower layer path is increased so as to increase the link capacity. In addition, when the amount of traffic is decreasing, a lower layer path is torn down so as to decrease the link capacity. A capacity variable link can be realized by dividing the upper layer signal into the increasing/decreasing lower layer path by the signal switching part controlled by the signal switching management part.

By adopting this structure, a mechanism can be realized in which the lower layer path is set up/torn down at any time according to the amount of traffic of the upper layer, so that each lower layer path is used efficiently. As a result, by sharing the increasing/decreasing lower layer paths in the lower layer network, a network of higher throughput can be realized by using fewer lower layer network resources.

The above object is also achieved by a capacity variable link setting method in a hierarchical network in which a link in an upper layer is formed by a path group of a lower layer, wherein the hierarchical network includes a node apparatus comprising means for editing an upper layer signal so as to divide the upper layer signal into each path in the path group in the lower layer, the capacity variable link setting method including:

a traffic data obtaining step of obtaining traffic data of the upper layer;

an increase/decrease determination step of determining increase or decrease of a lower layer path by using the traffic data;

an increase/decrease step in which, when it is determined that the lower layer path is to be increased or decreased, the node apparatus sends a request for increasing or decreasing the lower layer path from the upper layer to the lower layer, and the lower layer path is set up between the node apparatus and another node apparatus by using a lower layer signaling protocol on the basis of the request; and the upper layer signal is edited according to the number of lower layer paths in the node apparatus and in the other node apparatus.

According to the above-mentioned method, lower layer network resources can be used efficiently by performing, triggered by the result of determination in the upper layer, editing of the upper layer signal and increase/decrease of the lower layer path. That is, according to the above-mentioned method, control management systems of the upper layer and the lower layer are connected and cooperate with each other, whereas the control management systems of the upper layer and the lower layer operate independently in a conventional node apparatus. Since the upper layer network cooperates with the lower layer network, it becomes possible to perform editing of the upper layer signal and setting up of the lower layer path together and speedily. Thus, a link with a capacity corresponding to the changing traffic can be set on demand efficiently by using the lower layer signaling protocol, so that the lower layer network resources can be used efficiently and on-demand bandwidth can be provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention will be described.

First Embodiment

Figure 1:
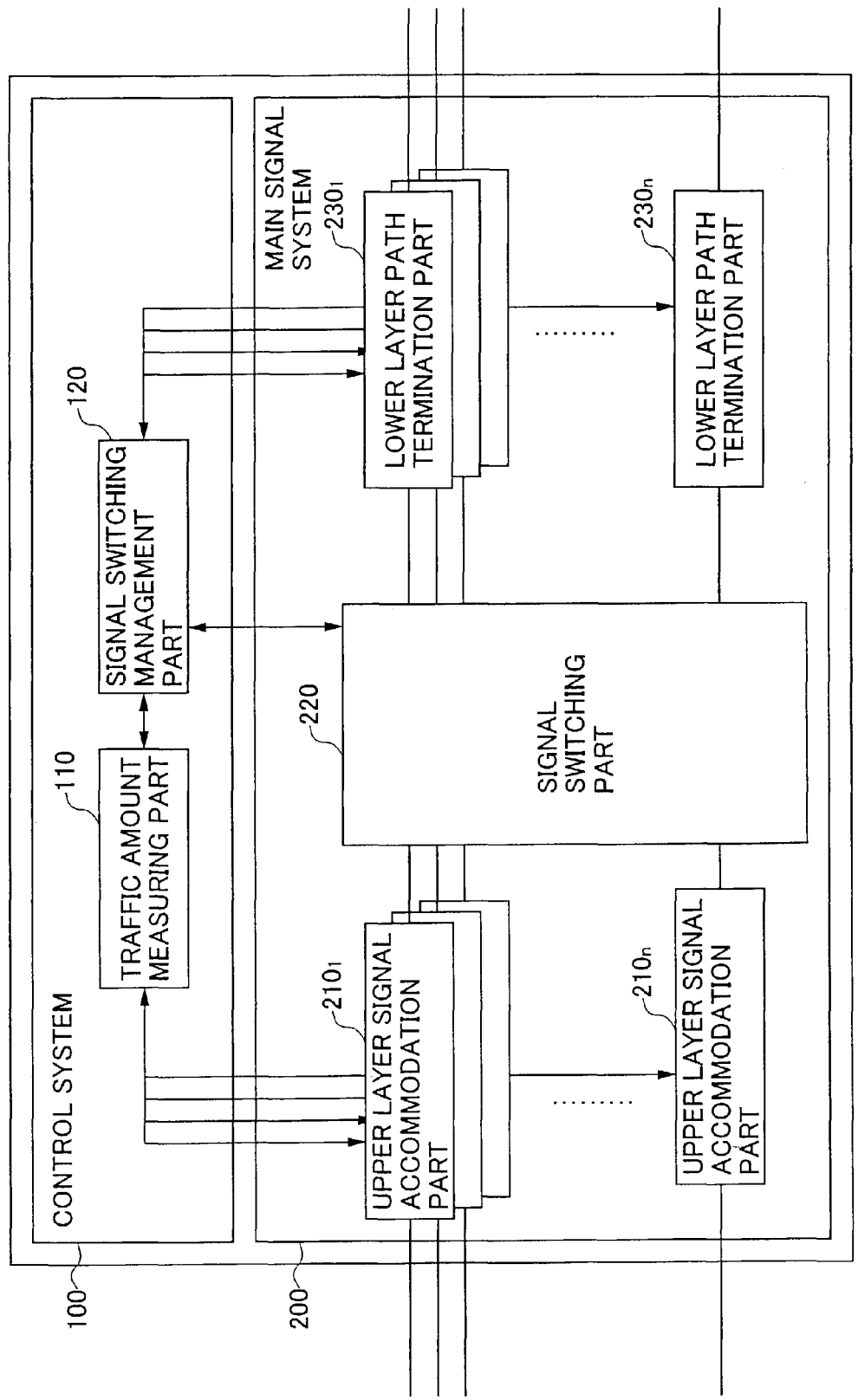
FIG. 1 is a block diagram of a capacity variable link apparatus according to a first embodiment of the present invention.

FIG. 1 is a block diagram of a capacity variable link apparatus in the first embodiment of the present invention. The capacity variable link apparatus shown in the figure includes a control system 100 and a main signal system 200. The control system 100 includes a traffic amount measuring part 110 and a signal switching management part 120.

The main signal system 200 includes an upper layer signal accommodation part 210 and a lower layer path termination part 230, and a signal switching part 220 between the upper layer signal accommodation part 210 and the lower layer path termination part 230, so as to control accommodation positions of an upper layer signal to lower layer paths.

In this embodiment, for accommodating the upper layer signal into the lower layer paths, the capacity of lower layer paths is not set to allow for the maximum traffic. Instead, the capacity is set to be smaller than the maximum traffic, in which, when the amount of traffic of the upper layer signal increases, the number of lower layer paths is increased so as to increase link capacity. When the amount of traffic of the upper layer signal decreases, the link capacity is decreased by decreasing the number of the lower layer paths. The signal switching part 220 divides the upper layer signal among the lower layer paths that increase or decrease in number, so that the capacity variable link is realized.

In this specification, "link" is an upper layer link for carrying the upper layer signal in which the capacity is variable. In the present invention, in order to allow the capacity of the upper layer link to be variable, the capacity of the lower layer path group that accommodates the upper layer link is increased or decreased. "Link capacity" is a capacity that is provided to the upper layer link by the lower layer path group, in which the link capacity is the same as the total sum of capacities of lower layer paths in the lower layer path group.

In the capacity variable link apparatus, for example, resources that are released due to decrease of upper layer traffic of a user can be reused for upper layer traffic of another user. Therefore, it becomes possible to determine the maximum total capacity of lower layer paths to be smaller than the maximum total link capacity of upper layer signals. That is, the lower layer network resources can be decreased for realizing the same throughput as in the upper layer.

As mentioned above, for editing the upper layer signal so as to accommodate it to the lower layer paths efficiently, the traffic amount measuring part 110 measures the upper layer traffic amount flowing into the upper layer signal accommodation part 210, determines whether setting of the lower layer paths needs to be changed according to the amount of traffic, and passes the result to the signal switching management part 120. Or, the traffic amount measuring part 110 may store the measured traffic data in a database, and obtain the traffic data from the database. By storing measured traffic data in a database, traffic forecasts can be made available using past traffic data.

The signal switching management part 120 controls the signal switching part 220 such that the signal switching part 220 edits the upper layer signal to accommodate it to the lower layer paths efficiently according to information obtained from the traffic amount measuring part 110. At the same time, the signal switching management part 120 controls the number of the lower layer paths by controlling the lower layer path termination part 230. Accordingly, the link capacity can be variable.

As will be described in an eleventh embodiment, the signal switching management part 120 may increase or decrease the number of lower layer paths by receiving notification on the basis of a message from another node, and by controlling the signal switching part 220 and the lower layer path termination part 230 according to the notification.

According to the capacity variable link apparatus, a mechanism can be realized in which the lower layer path is set up or torn down according to the amount of traffic of the upper layer, so that throughput of each lower layer path improves. As a result, the lower layer paths can be shared in the lower layer network, so that a network of higher throughput can be realized with fewer resources of the lower layer network. Specific examples of the signal switching part and the like will be described in a later-mentioned tenth embodiment.

Second Embodiment

Figure 2:
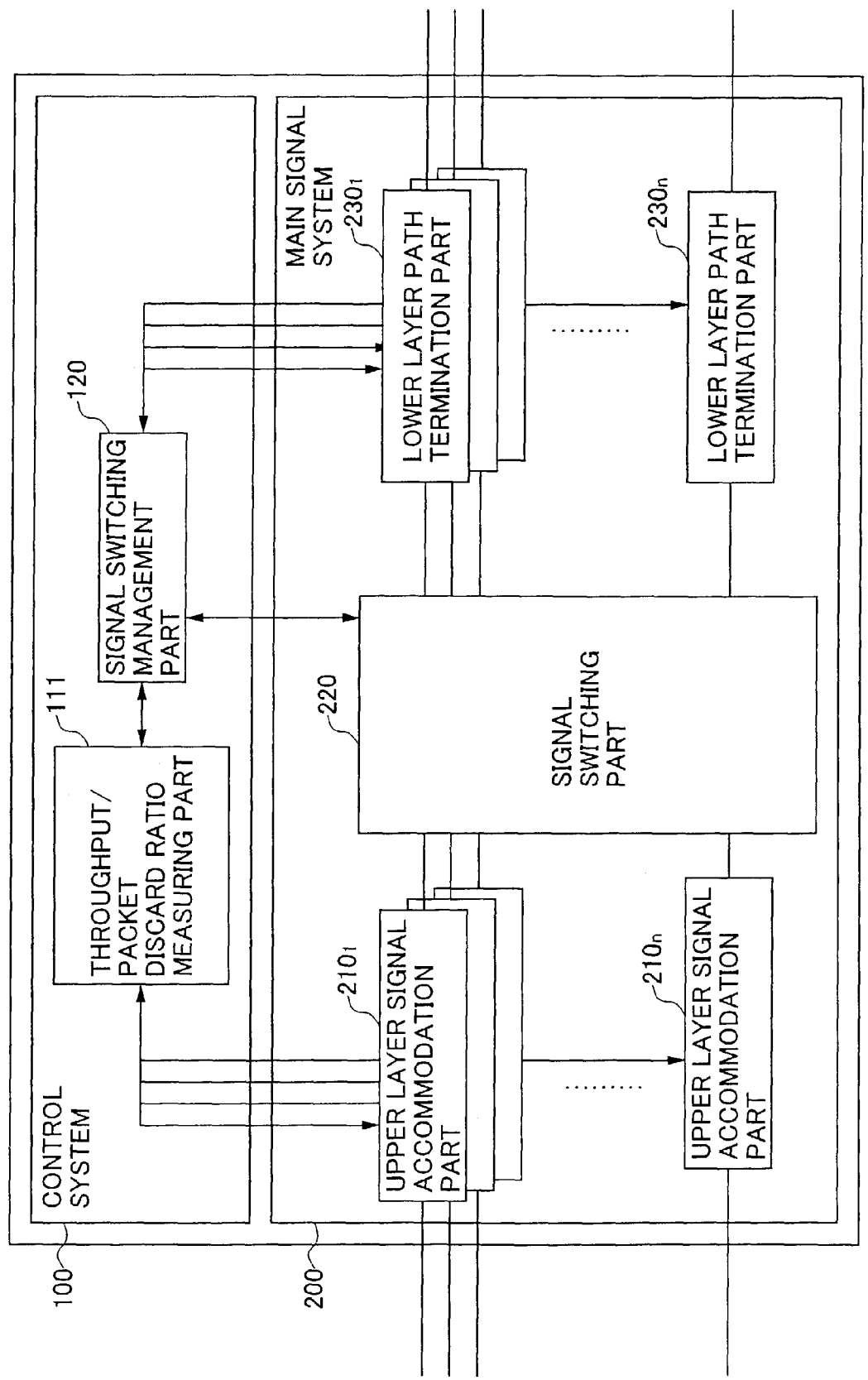
FIG. 2 is a block diagram of the capacity variable link apparatus according to a second embodiment of the present invention.

FIG. 2 is a block diagram of the capacity variable link apparatus according to the second embodiment of the present invention. In the following embodiments, the same numerals are assigned to the same parts as those of FIG. 1. The capacity variable link apparatus shown in FIG. 2 includes a throughput measurement or packet discard ratio measurement part 111 having a throughput measurement or packet discard ratio measurement function as the traffic amount measuring part 110 in the control system 100.

The throughput measurement or packet discard ratio measurement part 111 measures the throughput or packet discard ratio as a traffic measurement parameter of the upper layer signal, and compares the measurement value with a predetermined threshold.

When the measurement value exceeds the threshold, the number of the lower layer paths is increased and the setting for editing in the signal switching part 220 is changed, so that a capacity variable link is realized. In the same way, when the measurement value becomes lower than a threshold, the number of the lower layer paths is decreased and the setting of the signal switching part 220 is changed so that link capacity is decreased.

Third Embodiment

Figure 3:
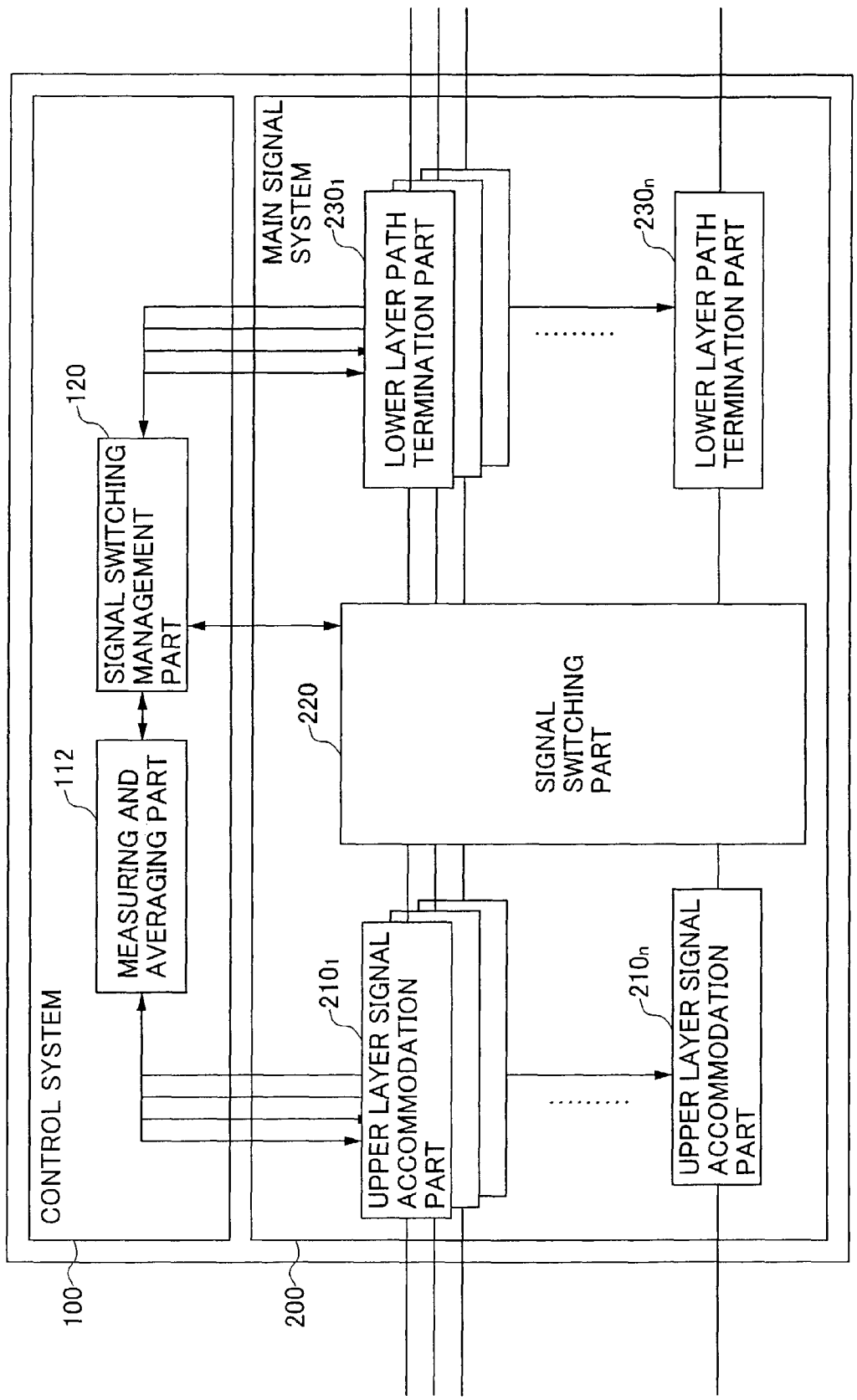
FIG. 3 is a block diagram of the capacity variable link apparatus according to a third embodiment of the present invention.

FIG. 3 is a block diagram of the capacity variable link apparatus according to the third embodiment of the present invention. The capacity variable link apparatus shown in FIG. 3 includes a measurement and averaging part 112 for performing measurement and averaging of traffic as the traffic amount measuring part 110 in the control system 100.

By providing the measurement and averaging part 112 for averaging the measurement parameter with respect to time, fluttering of the link capacity due to traffic change in a very short period can be suppressed. The measurement and averaging part 112 compares the calculated value and a predetermined threshold, and sends the result to the signal switching management part 120, so that the signal switching management part 120 sets the signal switching part 220.

The comparing method between the traffic data and the threshold will be described in the eleventh embodiment in detail.

Forth Embodiment

Figure 4:
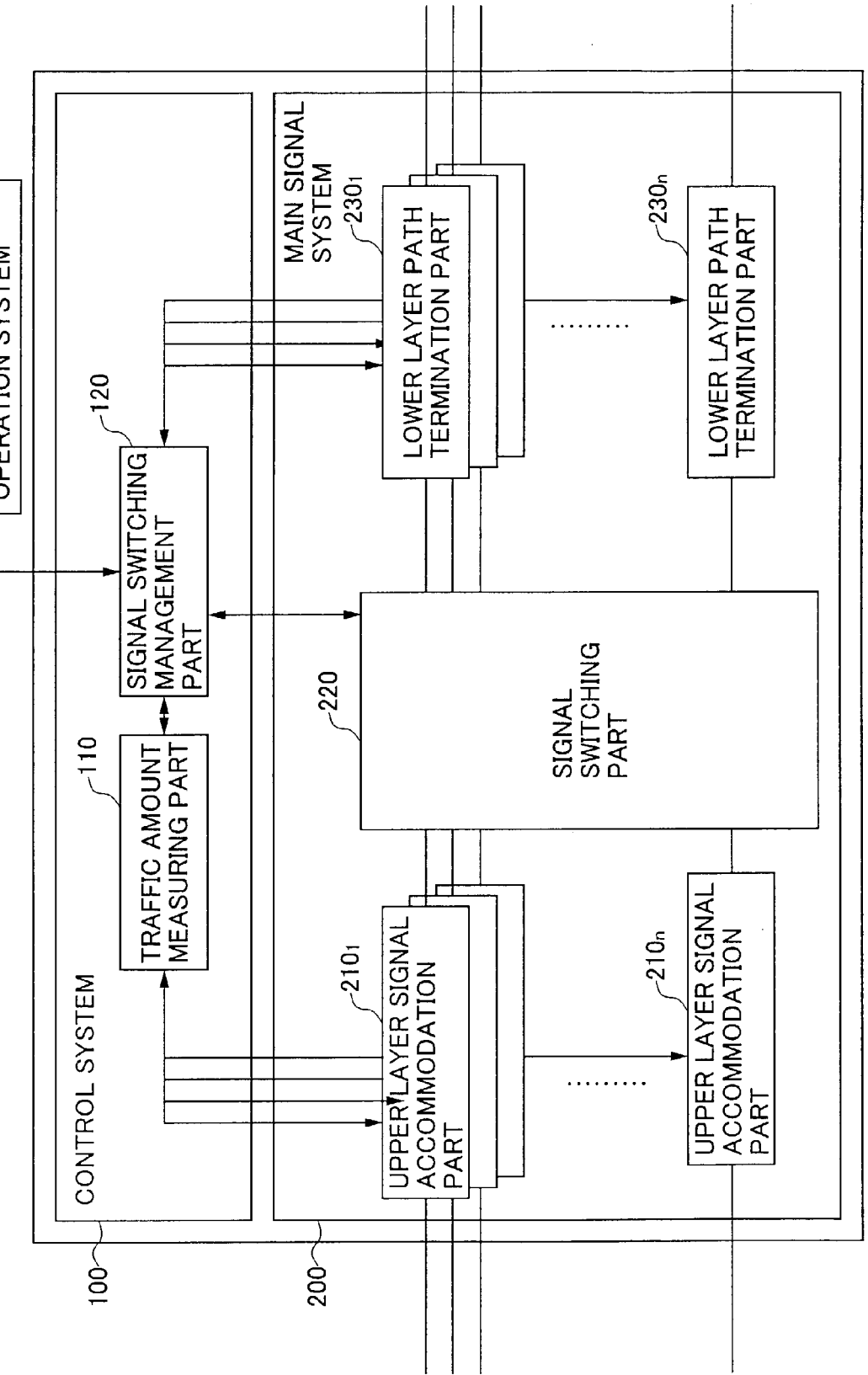
FIG. 4 is a block diagram of the capacity variable link apparatus according to a fourth embodiment of the present invention.

FIG. 4 is a block diagram of the capacity variable link apparatus according to the fourth embodiment of the present invention. A network management operation system 700 is connected to the signal switching management part 120 of the capacity variable link apparatus of FIG. 4. That is, the capacity variable link apparatus has means for accessing the network management operation system 700, and has a function for passing data obtained by giving the system 700 access to the signal switching management part 120. In addition, the capacity variable link apparatus includes means for uploading information on increases/decreases of the lower layer paths to a database of network management system.

The network management operation system 700 connected to the capacity variable link apparatus has a lower layer path network information database in which status of inventory of network resources is updated regularly and whenever necessary. By reading the status of inventory by accessing the network management operation system 700, the capacity variable link apparatus can search the database for network resources to be used for capacity increase, so that whether a path can be added can be grasped.

In management of the lower layer path in the network management operation system 700, a priority can be provided to each individual path (which is one of multiple paths forming a link). Accordingly, in the capacity variable link apparatus, contention control becomes possible by referring to the priority set in the network management operation system 700. More specifically, at the time of adding a new lower layer path, even when contention occurs between a path to be increased and a currently in use path, that is, even when there is no network resource for use to be increased, if there is a path having a lower priority than that of the path to be increased, the path having the lower priority is torn down so that a new path can be obtained for the increase. Therefore, use of the network resources can be optimized.

Fifth Embodiment

Figure 5:
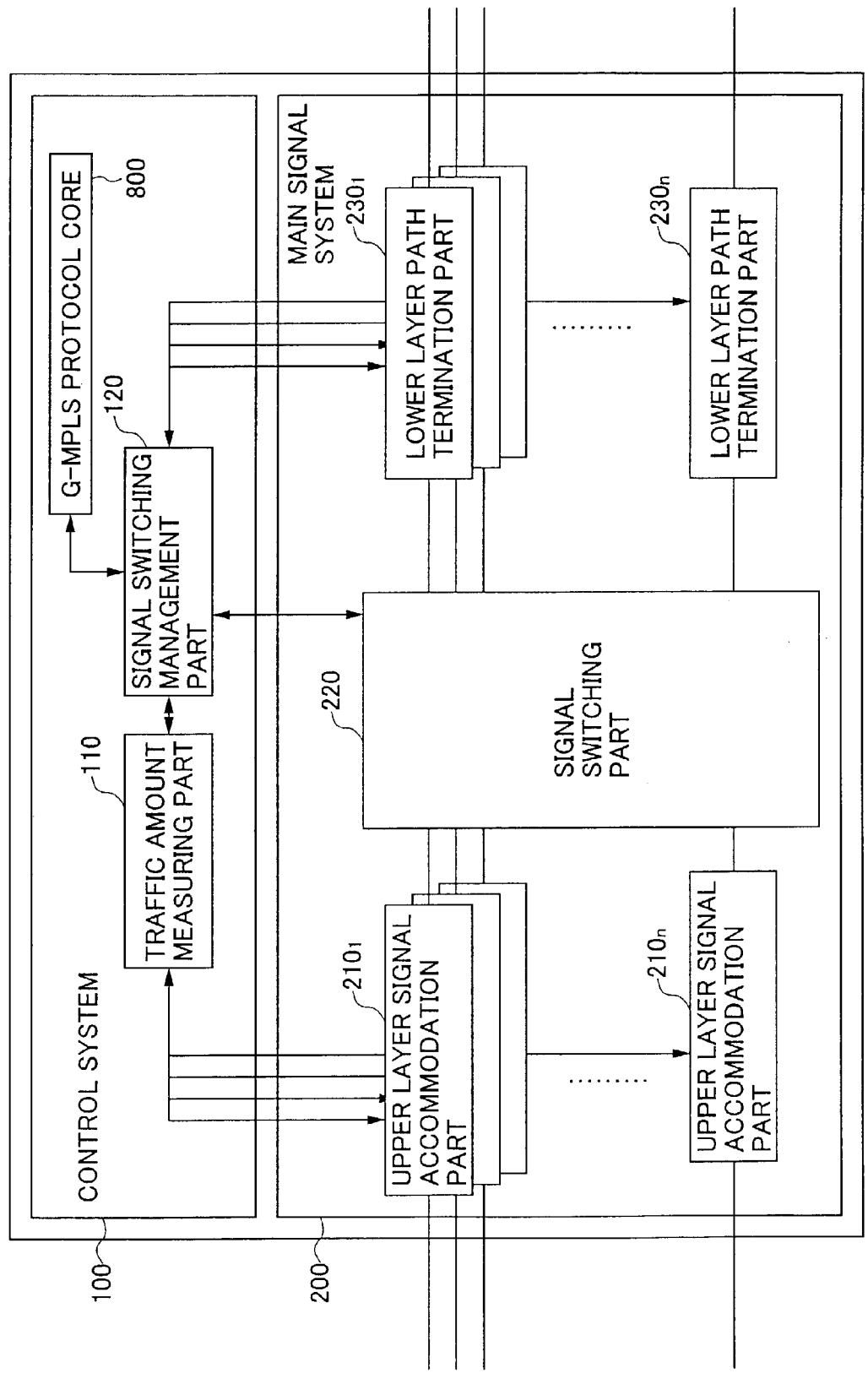
FIG. 5 is a block diagram of the capacity variable link apparatus according to a fifth embodiment of the present invention.

FIG. 5 is a block diagram of the capacity variable link apparatus according to the fifth embodiment of the present invention. A G (Generalized)-MPLS protocol core 800 is implemented in the control system 100 of the capacity variable link apparatus of FIG. 5. The G-MPLS protocol core can be implemented as software, firmware or the like.

That is, the capacity variable link apparatus has G-MPLS protocol core 800, and refers to use status of network resources that is updated and is managed by the G-MPLS protocol of the G-MPLS protocol core 800, so as to increase or decrease the capacity of paths. In addition, the capacity variable link apparatus includes means for uploading information on increases/decreases of the lower layer paths to a database. Accordingly, in the same way as the fourth embodiment, network resources to be newly used can be searched for.

In management of the lower layer path in the G-MPLS protocol core 800, a priority can be provided to each individual path (which is one of the paths forming a link). Accordingly, in the capacity variable link apparatus, contention control becomes possible by referring to the priority. More specifically, at the time of increase of a lower layer path, even when contention occurs between the path to be increased and a currently in use path, that is, even when there is no network resource for use to be added, if there is a path having a lower priority than that of the path group to be increased, the path having the lower priority is torn down so that a new path can be obtained. Therefore, use of the network resources can be optimized.

In addition, when a lower layer apparatus is provisioned by using G-MPLS technology by using the G-MPLS protocol core 800, a priority flag used for priority processing can be implemented in a shim header. For example, the flag can be implemented in an EXP field. By using such a configuration, a capacity variable link can be realized while compatibility with conventional G-MPLS technology can be completely kept.

Sixth Embodiment

Figure 6:
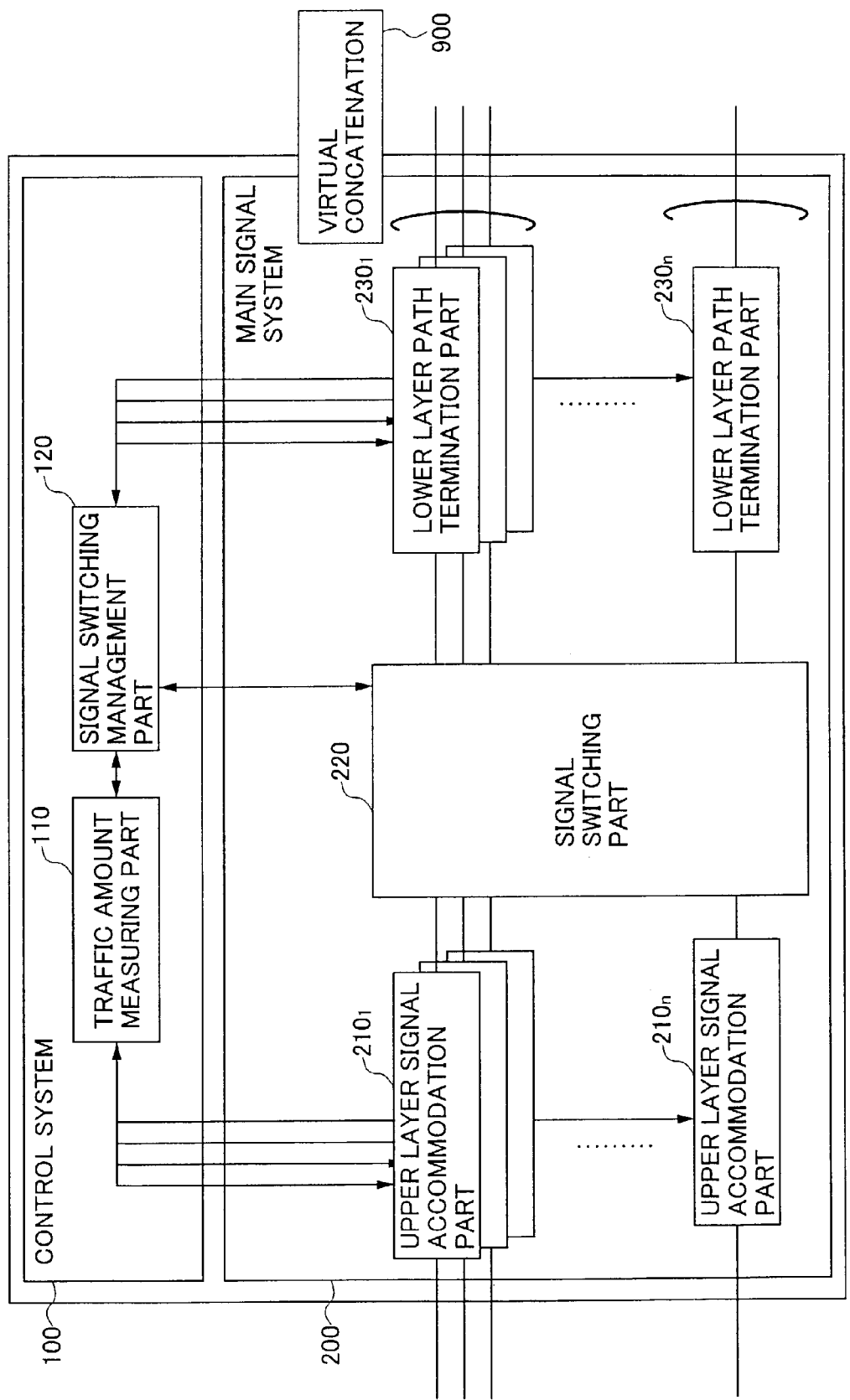
FIG. 6 is a block diagram of the capacity variable link apparatus according to a sixth embodiment of the present invention.

FIG. 6 is a block diagram of the capacity variable link apparatus according to the sixth embodiment of the present invention. The capacity variable link apparatus shown in FIG. 6 manages a capacity variable lower layer path group as a virtual concatenation path. Accordingly, capacity variable lower layer paths having the same end points can be operated and managed as one path in the lower layer. The control of the paths as a virtual concatenation path can be performed in the signal switching part and the lower layer path termination part, for example.

Seventh Embodiment

Figure 7:
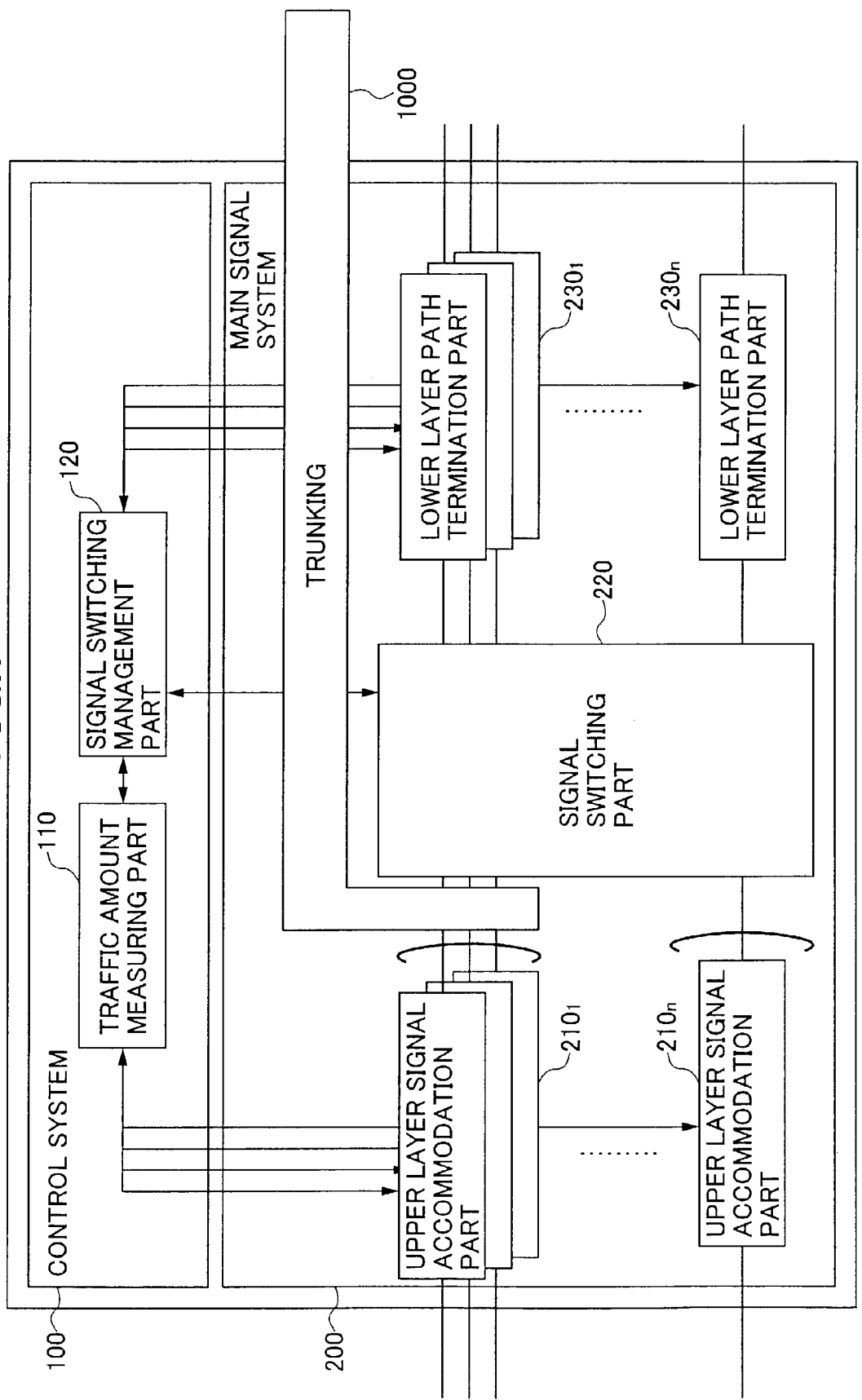
FIG. 7 is a block diagram of the capacity variable link apparatus according to a seventh embodiment of the present invention.

FIG. 7 is a block diagram of the capacity variable link apparatus according to the seventh embodiment of the present invention. The capacity variable link apparatus shown in FIG. 7 includes a trunking part 1000. By the trunking part 1000, the capacity variable link apparatus can treat a signal group sent from the signal switching management part 120 to the lower layer path termination part 230 as a logical link that is trunked in the upper layer. According to this operation, links having the same destination points can be regarded as one link logically, so that operability and manageability can be improved.

RPR/DPT (Resilient Packet Ring/Dynamic Packet Transport) protocol can be used by the trunking part 1000, in which a switched link can be provided in layer 2. By applying this method to two end points, the links can be treated as two links between two end points and as a collapsed link. Thus, when the amount of traffic of the upper layer is large, two links can be used, and, when the amount of traffic is small, one link can be used. Accordingly, the resource that is not used in the lower layer network can be released, so that a capacity variable link can be realized and the resource can be reused for other purposes.

As for the trunking part 1000, link aggregation technology that is defined in IEEE802.3ad can be also used. This method provides trunking in Ethernet networks. By applying this method to two end points, the link can be treated as a plurality of links between two end points. Thus, a link can be set up or torn down according to the amount of traffic of the upper layer. Accordingly, the resource that is not used in the lower layer network can be released, so that a capacity variable link can be realized and the released resource can be reused for other purposes.

Eighth Embodiment

Figure 8:
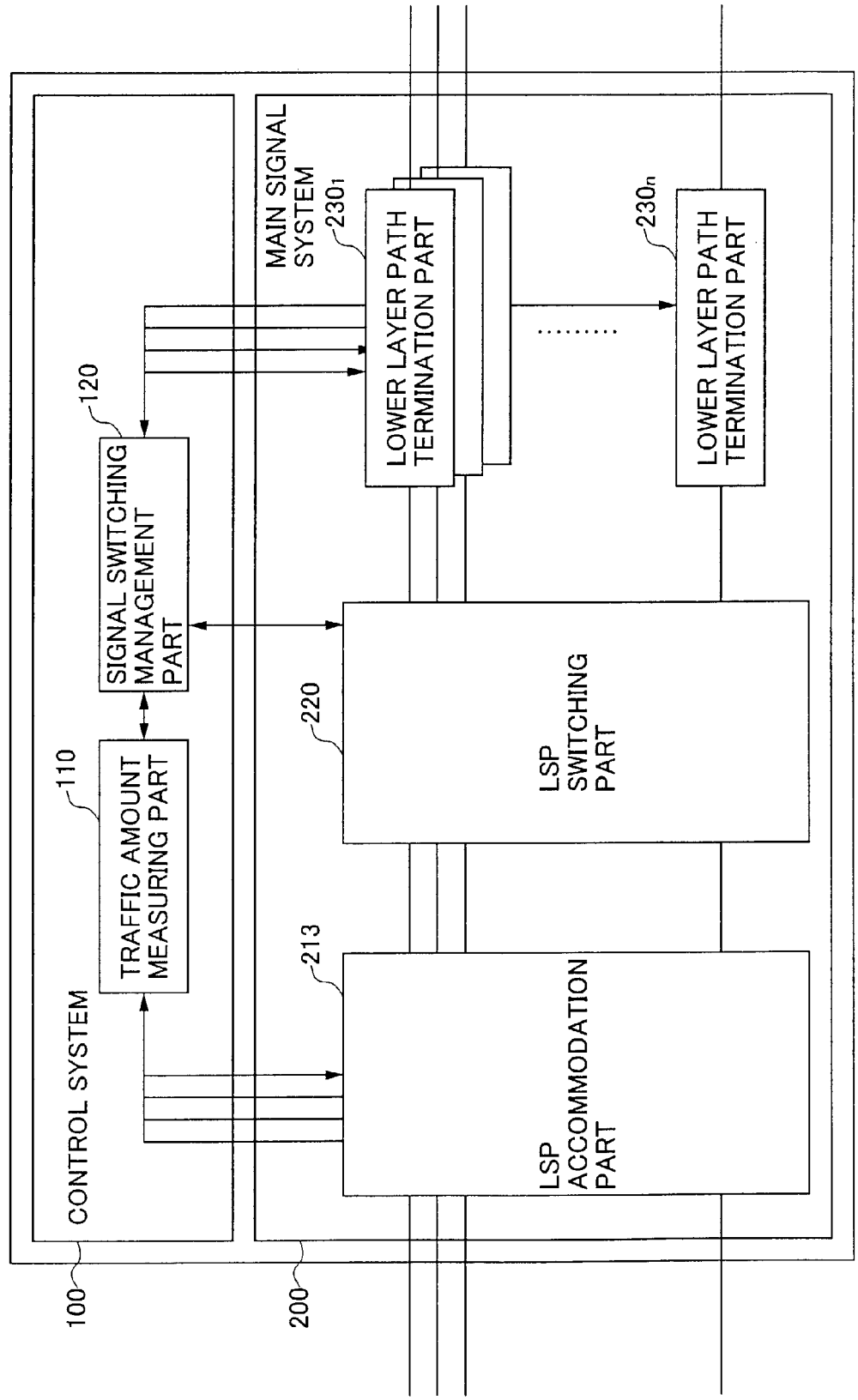
FIG. 8 is a block diagram of the capacity variable link apparatus according to an eighth embodiment of the present invention.

FIG. 8 is a block diagram of the capacity variable link apparatus according to the eighth embodiment of the present invention. The capacity variable link apparatus shown in FIG. 8 includes a LSP accommodation part 213 for processing a LSP signal. In this embodiment, a label switch path (LSP) signal of MPLS is used as an upper layer signal. In this case, a LSP editing part is used as the signal switching part. A label switch router (LSR) can be used as the LSP accommodation part and the LSP editing part.

According to this embodiment, if the total bandwidth of LSPs transferred to an end point through the label switch router changes with respect to time, the change can be absorbed in the lower layer according to the mechanism of changing the number of lower layer paths, so that the maximum capacity can be increased by efficiently using available resources in the lower layer network.

Ninth Embodiment

FIGS. 9-12 are block diagrams of the capacity variable link apparatus according to the ninth embodiment of the present invention. In the ninth embodiment, a lower layer path termination part applicable to a specific lower layer path is provided.

Figure 9:
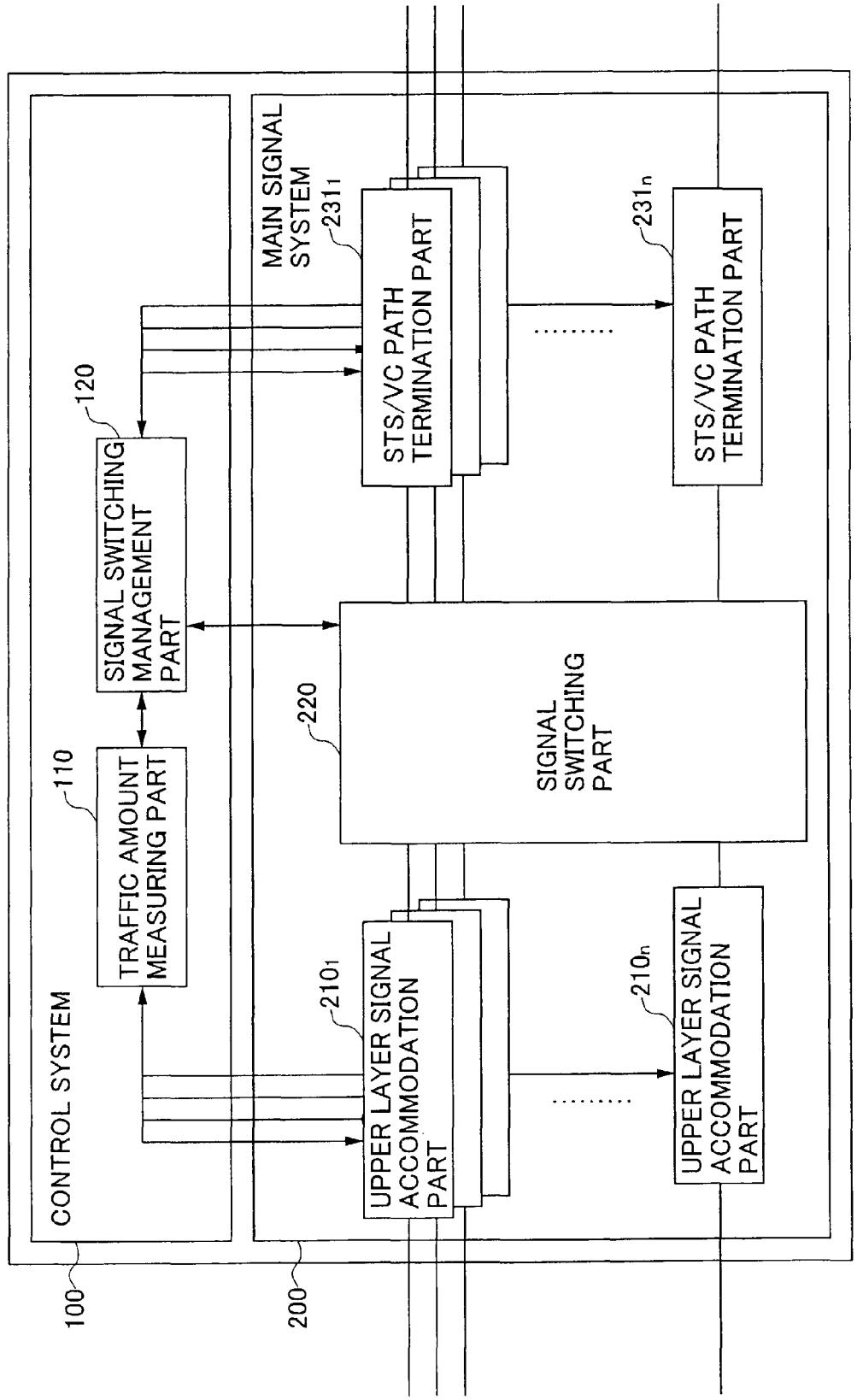
FIGS. 9-12 shows block diagrams of the capacity variable link apparatus according to a ninth embodiment of the present invention.

The capacity variable link apparatus shown in FIG. 9 includes a STS/VC (Synchronous Transport Signal/Virtual Concatenation) path termination part 231 as the lower layer path termination part 230. The STS/VC path termination part 231 is used when the lower layer signal is a STS/VC signal of SONET/SDH.

In the conventional Ethernet over SONET technology, capacity changeability is not realized. However, by providing the traffic amount measuring part 110, the signal switching part 220, and the signal switching management part 120, the number of STS/VC paths can be changed so that capacity changeability can be realized. When the upper layer signal is an Ethernet signal, as will be described in a tenth embodiment, the signal switching part 220 includes means for mapping an Ethernet signal to STS/VC.

Figure 10:
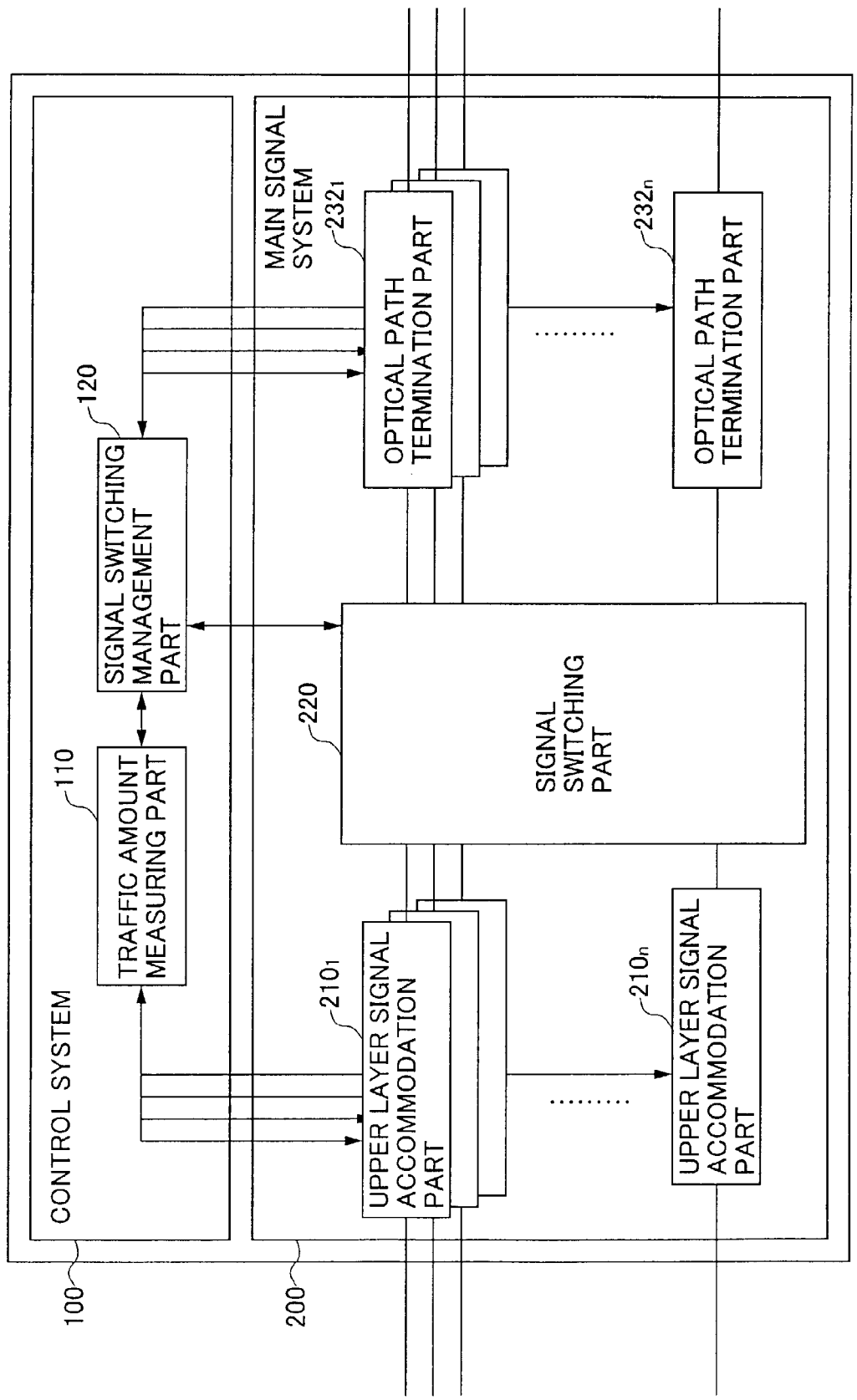

The capacity variable link apparatus shown in FIG. 10 includes an optical path termination part 232 as the lower layer path termination part 230. The optical path termination part 232 is used when the lower layer path is an optical path.

Figure 11:
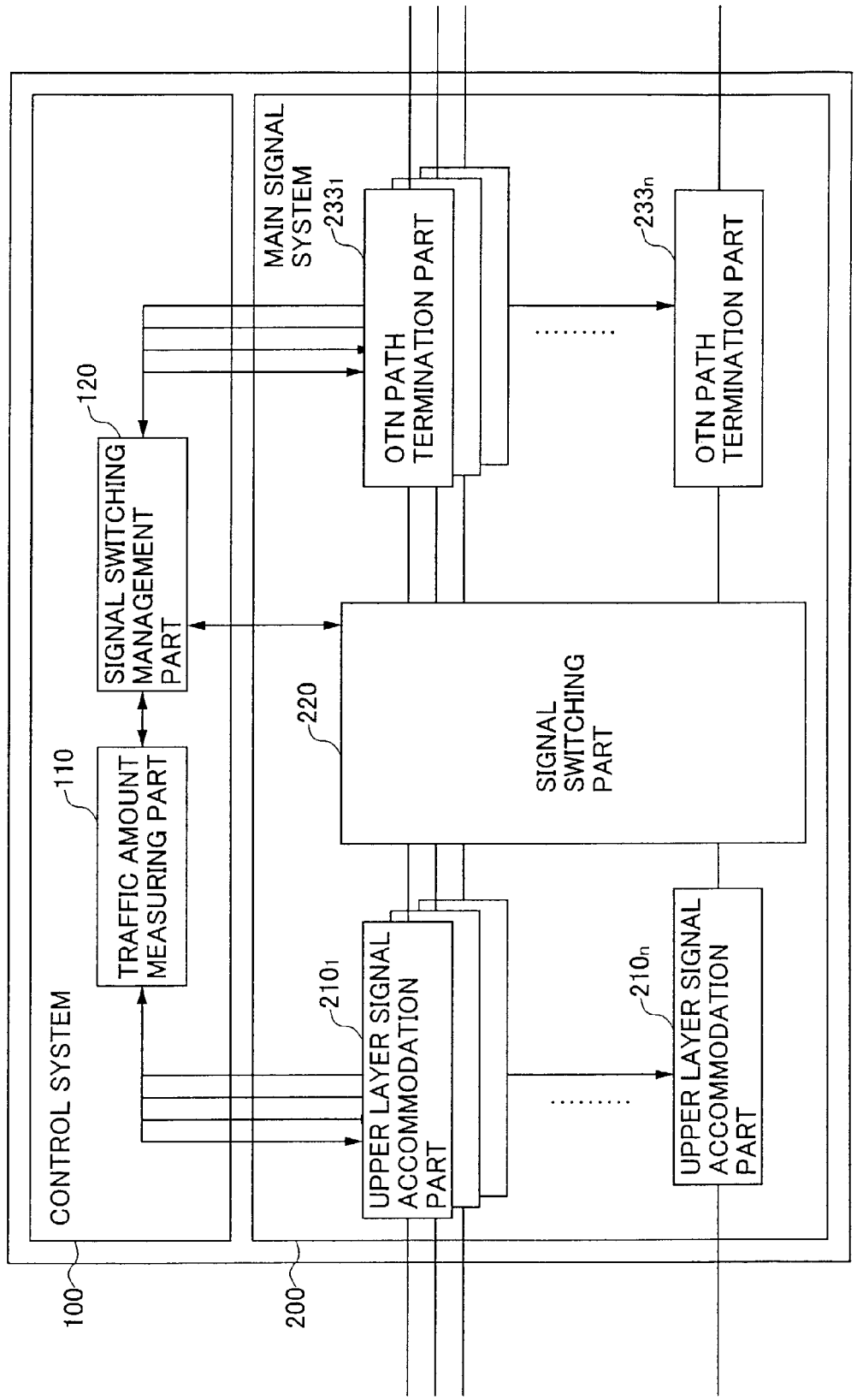

The capacity variable link apparatus shown in FIG. 11 includes, as the lower layer path termination part 230, an OTN path termination part 233 for terminating the optical path in an optical transport network layer. The OTN path termination part 233 is used when the optical path of the lower layer is an OTN optical path that is an optical path in conformity with ITU-T G.872. By changing the number of the OTN optical paths, it becomes possible to realize changeability of capacity.

The optical path in conformity with ITU-T G.872 includes an optical path in which a section overhead of the SDH signal defined in ITU-T G.707 is applied as an overhead and an optical path in conformity with ITU-T G.709. Therefore, the OTN path termination part 233 terminates the optical path to which G.707 section overhead is applied as well as the optical path in conformity with ITU-T G.709.

Figure 12:
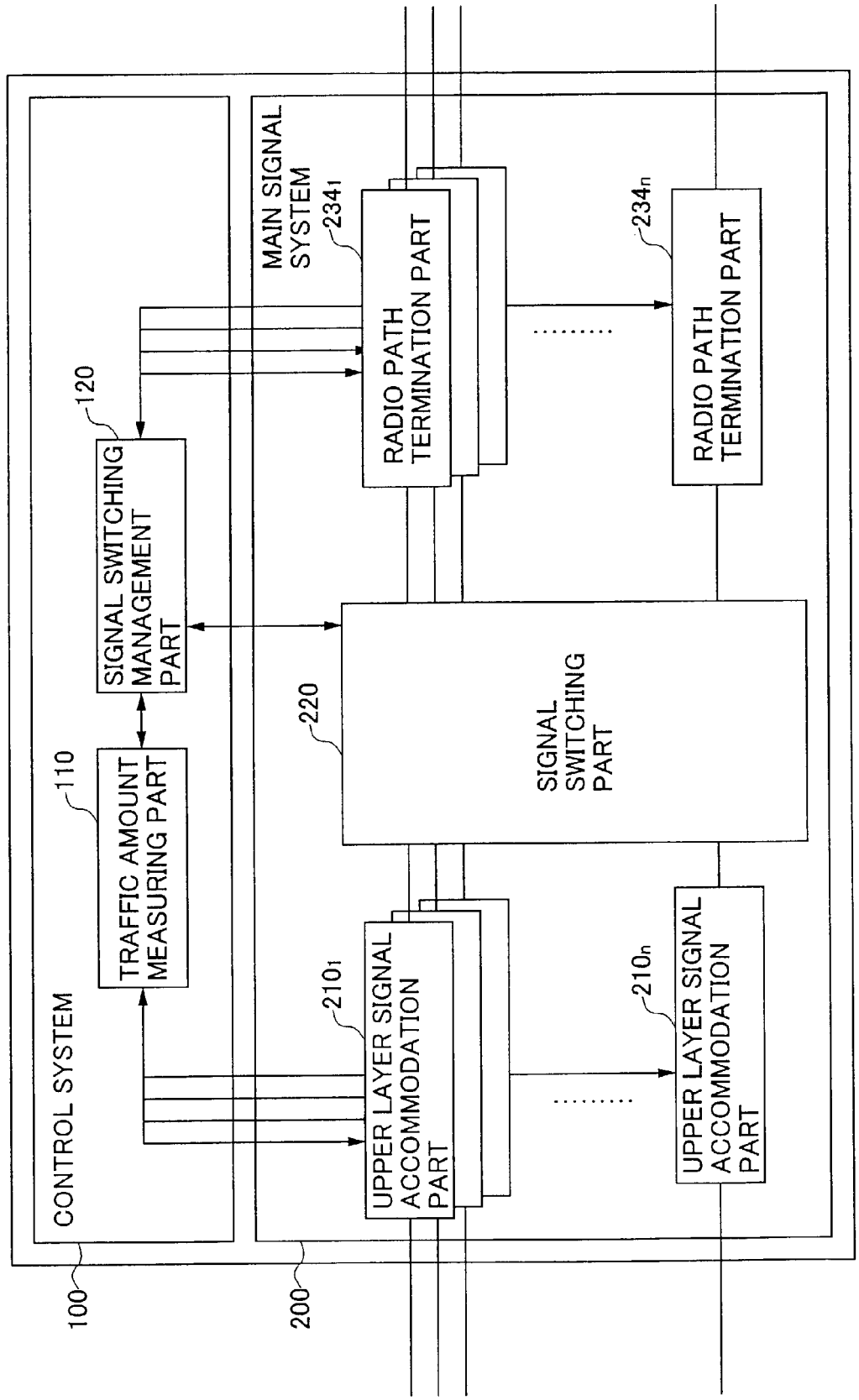

The capacity variable link apparatus shown in FIG. 12 includes, as the lower layer path termination part 230, a radio path termination part 234 for terminating a radio path in radio transmission. The radio path termination part 234 is used especially when the signal of the lower layer is a radio path. By changing the number of radio paths, capacity changeability can be realized.

Tenth Embodiment

Figure 13:
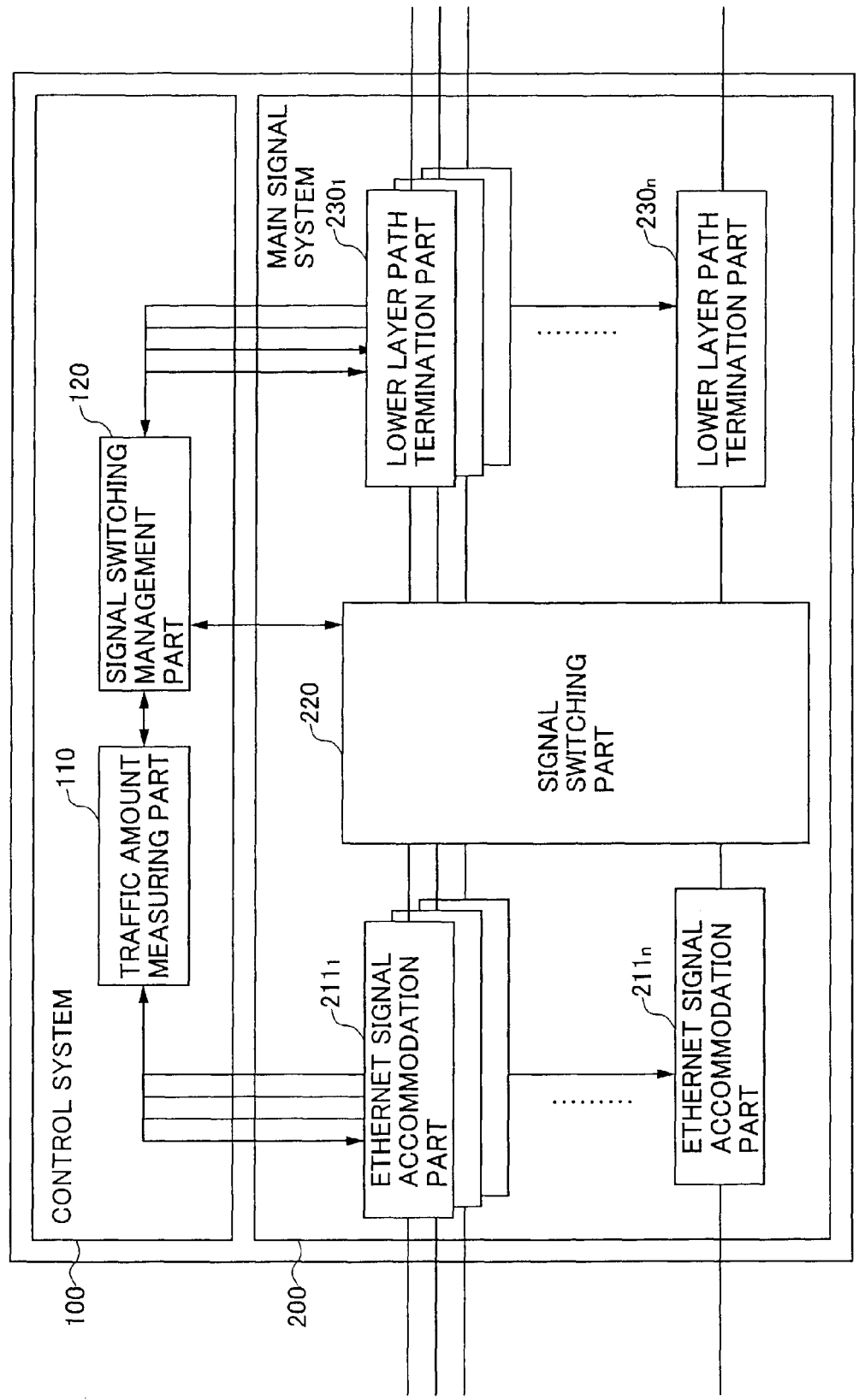
FIG. 13 is a block diagram of the capacity variable link apparatus according to a tenth embodiment of the present invention.

In the tenth embodiment, as shown in FIG. 13, an Ethernet signal accommodation part 211 for processing an Ethernet signal is used as the upper layer signal accommodation part 210. In addition, in this embodiment, detailed configurations of the signal switching part and the like will be described when an Ethernet signal is used as the upper layer signal.

In the specification of the Ethernet, capacity changeability is not realized. However, it is known that the traffic of the Ethernet has burst characteristics. According to the conventional technology, there is no mechanism for capacity changeability. Thus, the amount of resources of the lower layer is fixed. By providing the mechanism for capacity changeability, available resources can be used efficiently in the lower network side, so that the maximum capacity can be increased.

Figure 14:
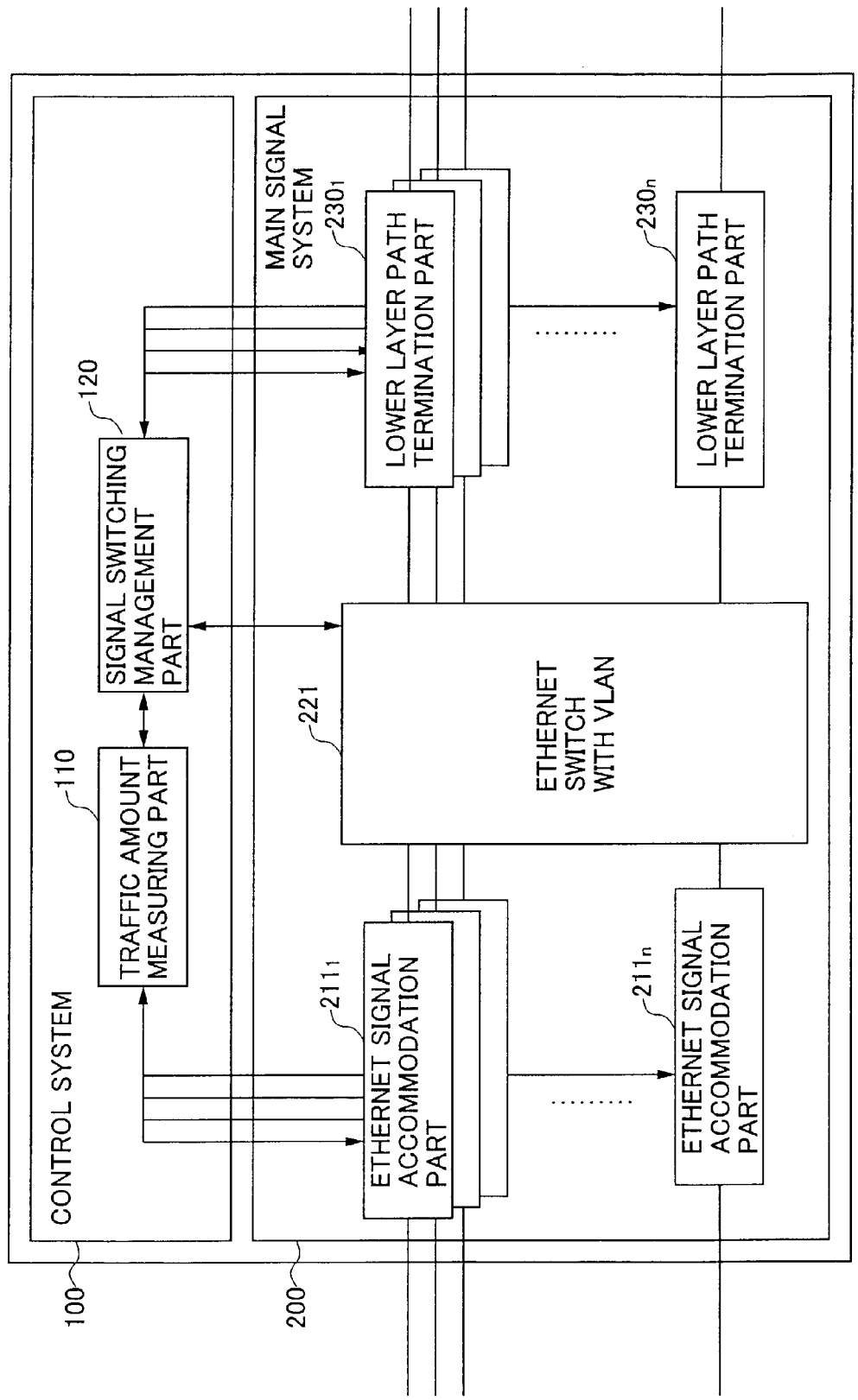
FIG. 14 shows a configuration example in which the signal switching part 220 is realized by using an Ethernet switch 221 that can change VLAN setting.

FIG. 14 shows a configuration example in which the signal switching part 220 is realized by using an Ethernet switch 221 that can change VLAN settings. The Ethernet switch 221 has the functionality for changing VLAN settings. The Ethernet switch 221 has a function for realizing a network in which signals on a plurality of Ethernets can be transferred to link destinations while the Ethernets is separated. A path in the lower layer side is set up or torn down according to increase or decrease of traffic of upper layer signals. In addition, assignment relationship between each Ethernet and a plurality of paths in the lower layer is changed by changing the VLAN settings, so that the capacity of the link can be changed for each of the Ethernets.

Figure 15:
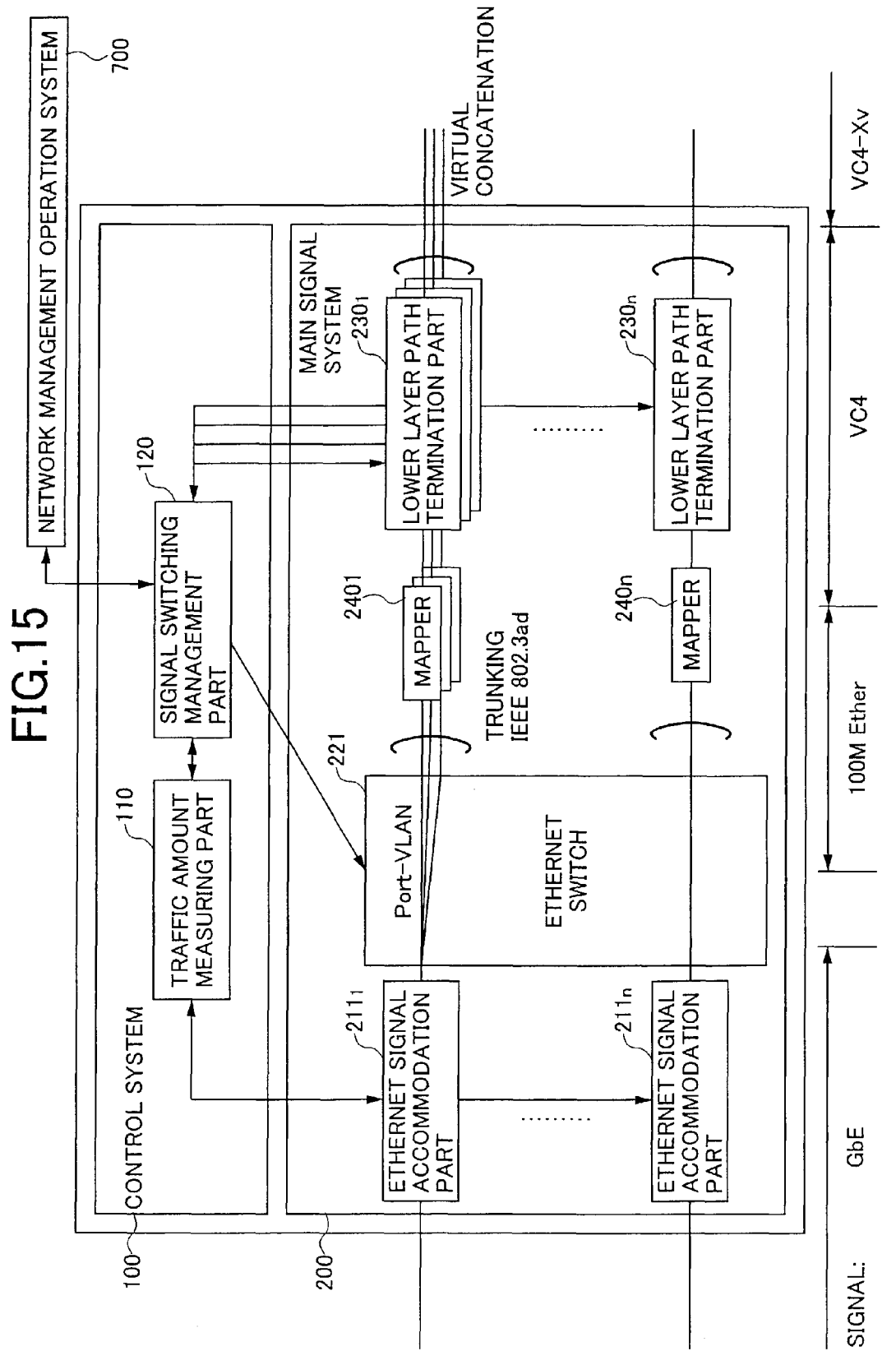
FIG. 15 is a figure showing the configuration shown in FIG. 14 in more detail.

FIG. 15 is a figure showing the configuration shown in FIG. 14 in more detail. In the configuration shown in FIG. 15, a gigabit Ethernet signal is input or output as the upper layer signal. The Ethernet switch separates a signal that passes through the Ethernet signal accommodation part 211 into a plurality of 100 Mbit/s Ethernets. The Ethernet switch 221 uses port based VLAN technology for keeping the separation relationship of the Ethernets.

A group of the 100 Mbit/s Ethernets that belongs to the same network as the Ethernet signal accommodation part 211 is managed as one logical link by using link aggregation technology. Each 100 Mbit/s Ethernet is mapped into a VC4 path by a mapper 240. In addition, the lower layer path termination part 230 performs VC path termination in SDH networks, so that the group of paths is managed as a VC4 virtually concatenation path (VC4-Xv) that is an X 150 Mbit/s path.

In the configuration shown in FIG. 15, if the amount of traffic of the gigabit Ethernet signal changes, the signal switching part 120 performs setting change of the port-VLAN, setting change of IEEE802.3ad trunking, and setting change of the virtual concatenation, such that the gigabit Ethernet signal is edited and divided into an optimal number of 100 Mbit/s signals according to the result of measurement by the traffic amount measurement part 110 and according to the determination result. For example, if the amount of traffic of the gigabit Ethernet signal is equal to or lower than 100 Mbit/s, one 100 Mbit/s Ethernet is used, that is, VC4-1v is used. If the amount of traffic of the gigabit Ethernet signal is 1 Gbit/s (maximum), 10 100 Mbit/s Ethernets are used, that is, VC4-10v is used.

For performing this control, the signal switching management part 120 makes an inquiry about availability of lower layer network resources to the network management operation system 700. When there are available resources, a capacity increase operation is performed in the lower layer path termination part 230 and the like by using the available resources. If the priority of the path to be used for capacity increase is higher than that of a path that is currently being used, the path that is currently being used is torn down so that the resources are released for the path to be increased. Then, the capacity increase operation is performed by using the released resources. As a result, the capacity variable link apparatus is realized.

In the example shown in FIG. 15, although a 100 Mbit/s Ethernet signal is used as the upper layer signal, the configuration can be applied to an Ethernet signal of another speed, a fibre channel signal, and LSP in MPLS.

In the lower layer path, the STS/VC signal in SONET/SDH can be not only a normal optical SDH signal but also a radio SDH signal.

Figure 16:
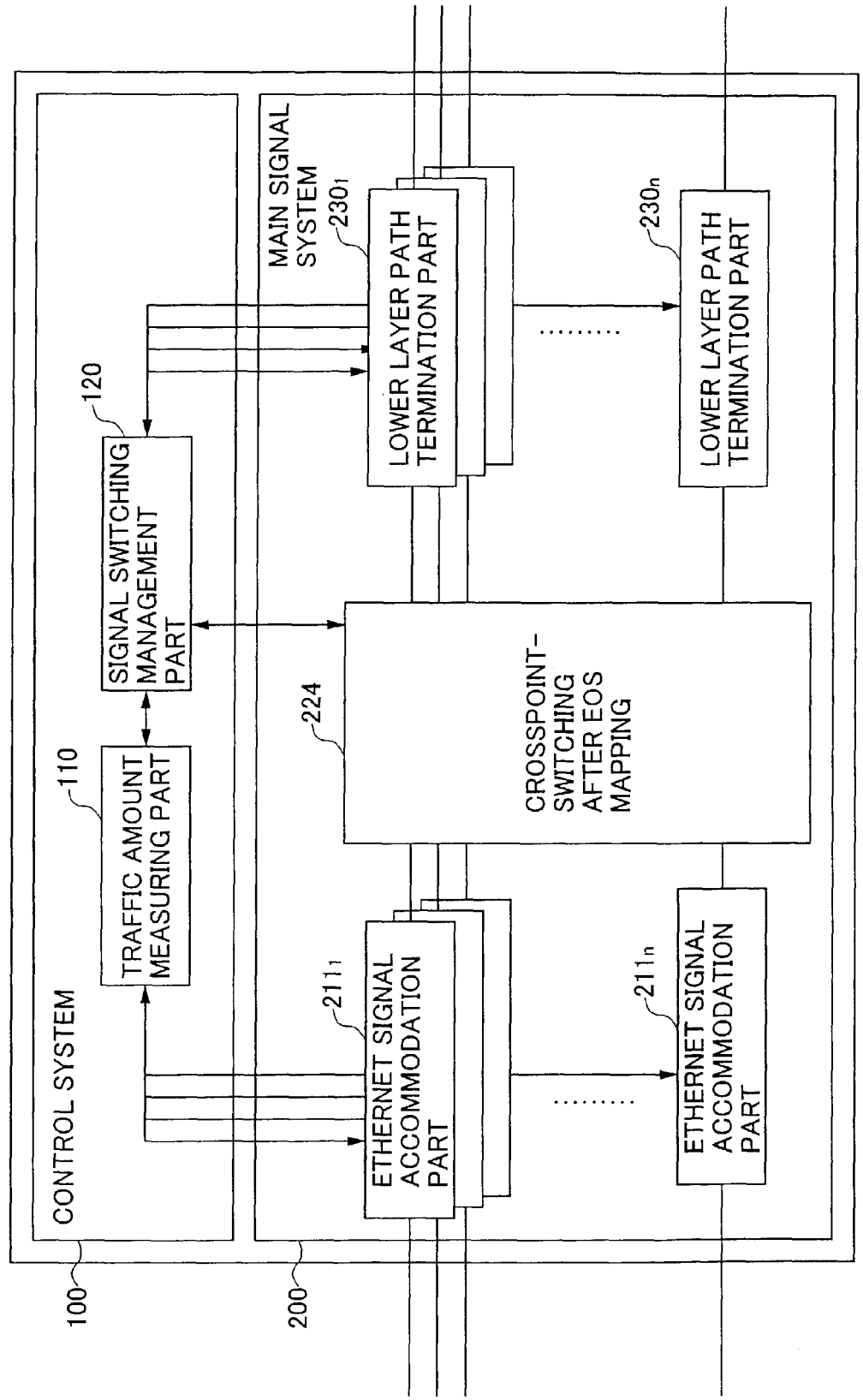
FIG. 16 shows another example of a case using an Ethernet signal accommodation part.

FIG. 16 shows another example of the case using the Ethernet signal accommodation part. In the capacity variable link apparatus, an Ethernet switch part 224 (configuration for crosspoint switching after Ethernet over SONET mapping) divides each Ethernet signal of the upper layer into a plurality of signals. Then, each divided Ethernet signal is mapped into a lower layer signal. Among the mapped lower layer signals, signals having bandwidth necessary for amount of traffic of the Ethernet signal of the upper layer are passed to the lower layer path termination part by the crosspoint switch. Accordingly, a network can be realized in which a plurality of Ethernet signals are transferred to a link destination while they are separated. At the same time, link capacity of each Ethernet can be changeable.

Figure 17:
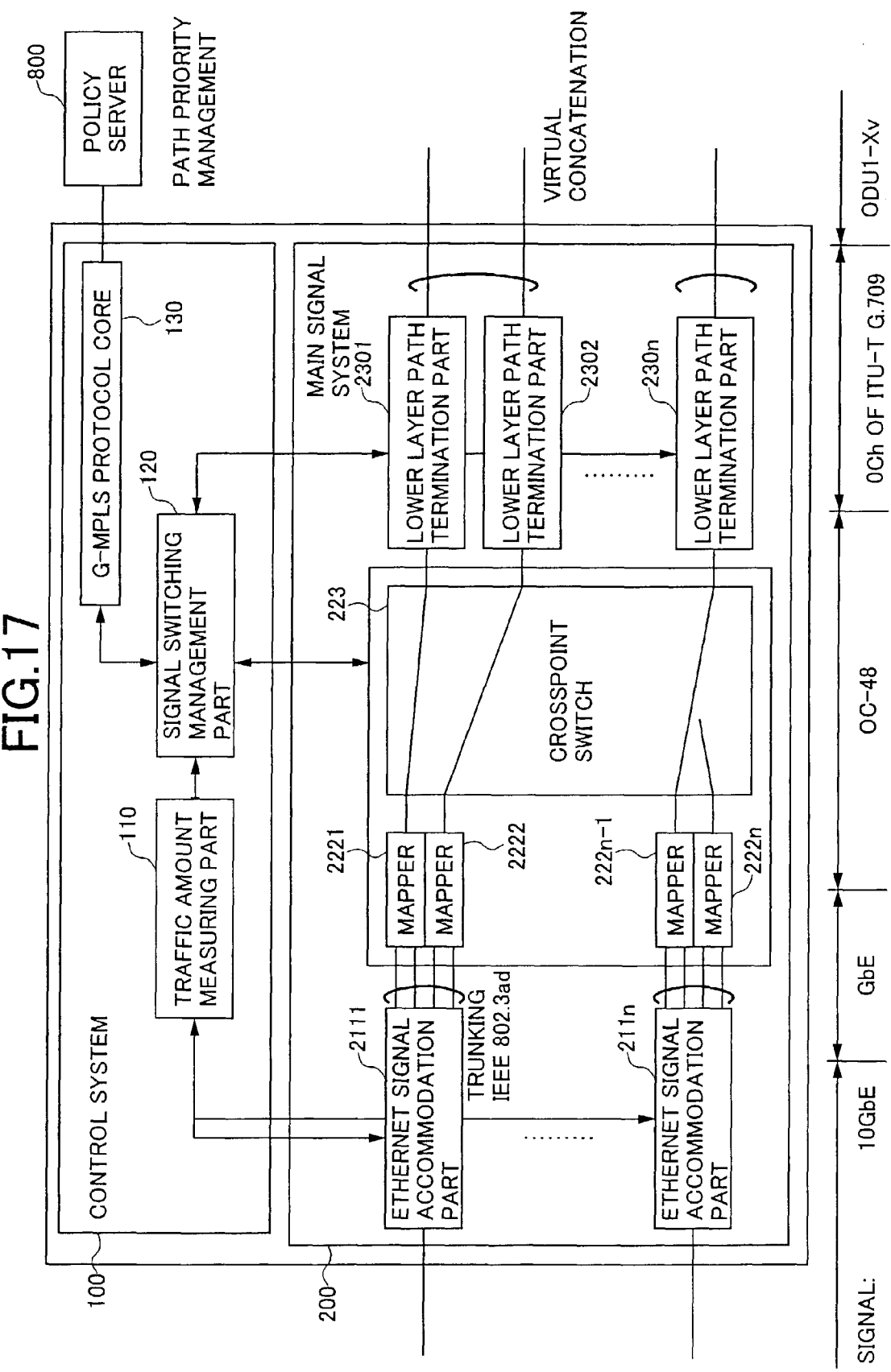
FIG. 17 is a figure showing the configuration of FIG. 16 in more detail.

FIG. 17 is a figure showing the configuration of FIG. 16 in more detail. In this configuration, input or output of 10 gigabit Ethernet signals is performed. A group of gigabit Ethernets that belong to the same network of the 10 gigabit Ethernet signal accommodation part 211 is managed by a logical link by using the link aggregation technology defined in the IEEE802.3ad. The mapper 222 bundles two gigabit Ethernets, and maps the bundle into an OC-48 signal by using Ethernet Over SONET technology. The mapper also has a function of demapping. The crosspoint switch for switching stream data connects OC-48 signals having a bandwidth necessary for the amount of traffic of the upper layer signal to the lower layer path termination part 230.

In the lower layer path termination part 230, ODU1 is terminated as OCh in conformity with ITU-T G.709. In addition, ODU1s that belong to the same network are managed as an ODU1 virtually concatenation path (ODU1-Xv) that is X 2.4 Gbit/s paths.

In this apparatus, when the amount of traffic in the 10 gigabit Ethernet signal changes, the signal switching management part 120 changes virtual concatenation settings of the crosspoint switch according to the measurement result of the traffic amount measuring part 110 and the determination result, such that an optimal number of OC-48 signals are connected to the lower layer path termination part 230.

For performing this control, the signal switching management part 120 makes an inquiry about availability of lower layer network resources to the G-MPLS protocol core or to the policy server. When there are available resources, a capacity increase operation is performed by using the available resources. If the priority of the path to be used for capacity increase is higher than that of a path that is currently being used, the path that is currently being used is torn down so that the resources are released for the path to be increased. Then, the capacity increase operation is performed by using the released resources. As a result, a capacity variable link apparatus is realized.

In the example shown in FIG. 17, although a 10 Gbit/s Ethernet signal is used as the upper layer signal, the configuration of the example can be applied to another signal accommodated in an ODU3 signal of 40 Gbit/s, an Ethernet signal of another speed, a fibre channel signal, and LSP in MPLS. In addition, in the configuration of FIG. 17, an optical transport network signal can be used as the lower layer signal. Therefore, "OCh in conformity with ITU-T G.709" and "ODU1-Xv" can be replaced by "OCh in conformity with ITU-T G.872".

Figure 18:
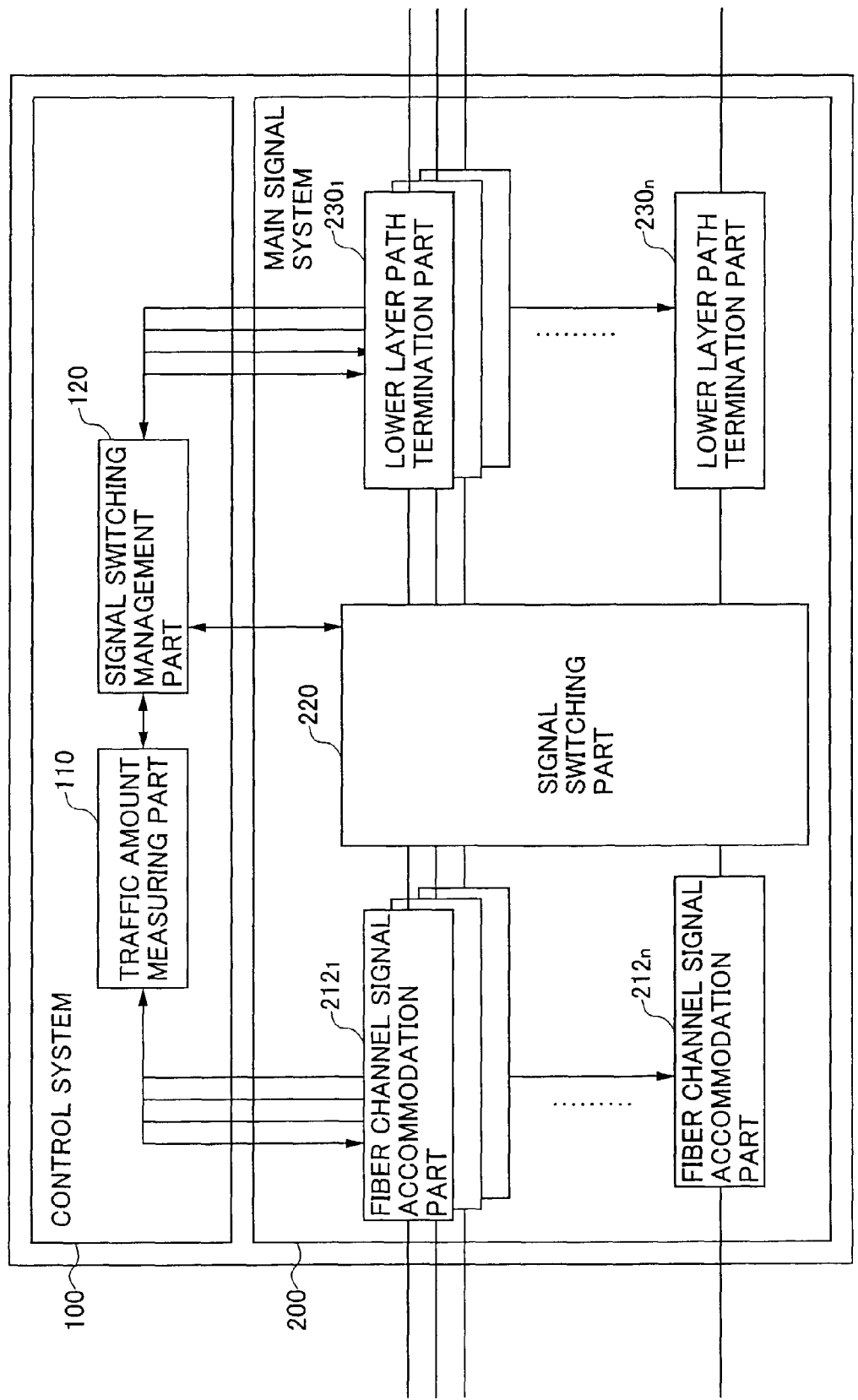
FIG. 18 shows a configuration in which a fibre channel signal is used as the upper layer signal.

FIG. 18 shows a configuration in which the fibre channel signal is used. In this configuration, a fibre channel signal accommodation part 212 is used as the upper layer signal accommodation part. In addition, a fibre channel switch is used as the signal switching part. More particularly, in the above-mentioned configuration using the Ethernet, "VLAN" is replaced by zoning or VSAN (Virtual Storage Area Network), and "trunking" is replaced by trunking or TSL (Inter-Switch Link)-Trunking. By using this configuration, the same operation can be realized as that in the case of using the Ethernet.

In the specification of the fibre channel, capacity changeability is not realized. However, it is known that the traffic of the fibre channel has burst characteristics. According to the conventional technology, there is no mechanism for capacity changeability. Thus, the amount of resources of the lower layer is fixed. By providing the mechanism for capacity changeability, available resources can be used efficiently in the lower network side, so that the maximum capacity can be increased.

In addition, as for the lower layer path, the STS/VC path in SONET/SDH, the radio path or the like can be used.

Eleventh Embodiment

In embodiments after the eleventh embodiment, capacity changeability of the lower layer paths is realized in a network including a plurality of nodes. In the eleventh embodiment, the capacity variable link apparatus is provided in a node in the hierarchical network. A start point node, a relay point node and an end point node communicate and cooperate, so as to increase or decrease lower layer paths. The hierarchical network is a network in which a link of an upper layer is formed by a plurality of paths of the lower layer.

In embodiments hereinafter, the start point node is an edge node at which traffic flows from the upper layer into the lower layer, the relay point node is a core node that relays the traffic in the lower layer, and the end point node is an edge node at which the traffic flows from the lower layer out to the upper layer. In the following, a capacity variable link setting method for using network resources efficiently will be described. In the method, paths forming the link are set up in the lower layer network, configuration of the link is changed, and the upper layer signal is speedily edited, according to the amount of traffic of the upper layer signal that changes with respect to time.

Figure 19:
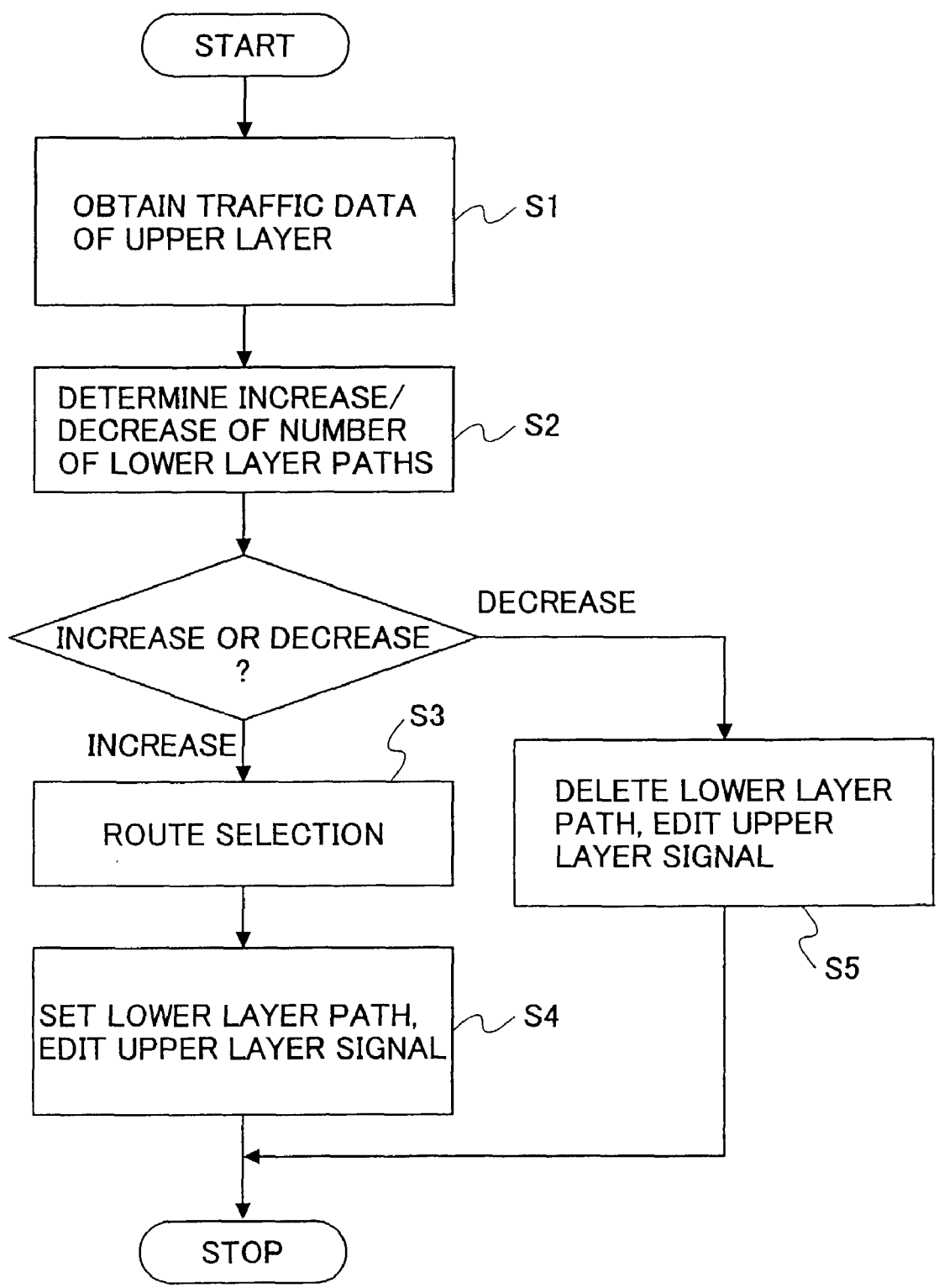
FIG. 19 is a figure for explaining a general outline of a capacity variable link setting method according to an eleventh embodiment of the present invention.

FIG. 19 is a figure for explaining a general outline of the capacity variable link setting method of this embodiment. First, the start point node obtains traffic data of the upper layer in step 1. Then, the start point node makes a determination whether the number of lower layer paths is to be increased or decreased in step 2. According to the result of the determination, if it is determined that the number of the lower layer paths is to be increased, a route for the lower layer path to be increased is selected, and, the lower layer path is set up by using signaling, and the upper layer signal is edited in step 3. According to the determination, if it is determined that a lower layer path is to be torn down, the lower layer path to be torn down is torn down by using signaling, and the upper layer signal is edited in step 4. The editing of the upper layer signal is performed by dividing the upper layer signal into a lower layer path group in which the number of lower layer paths is increased or decreased.

Figure 20:
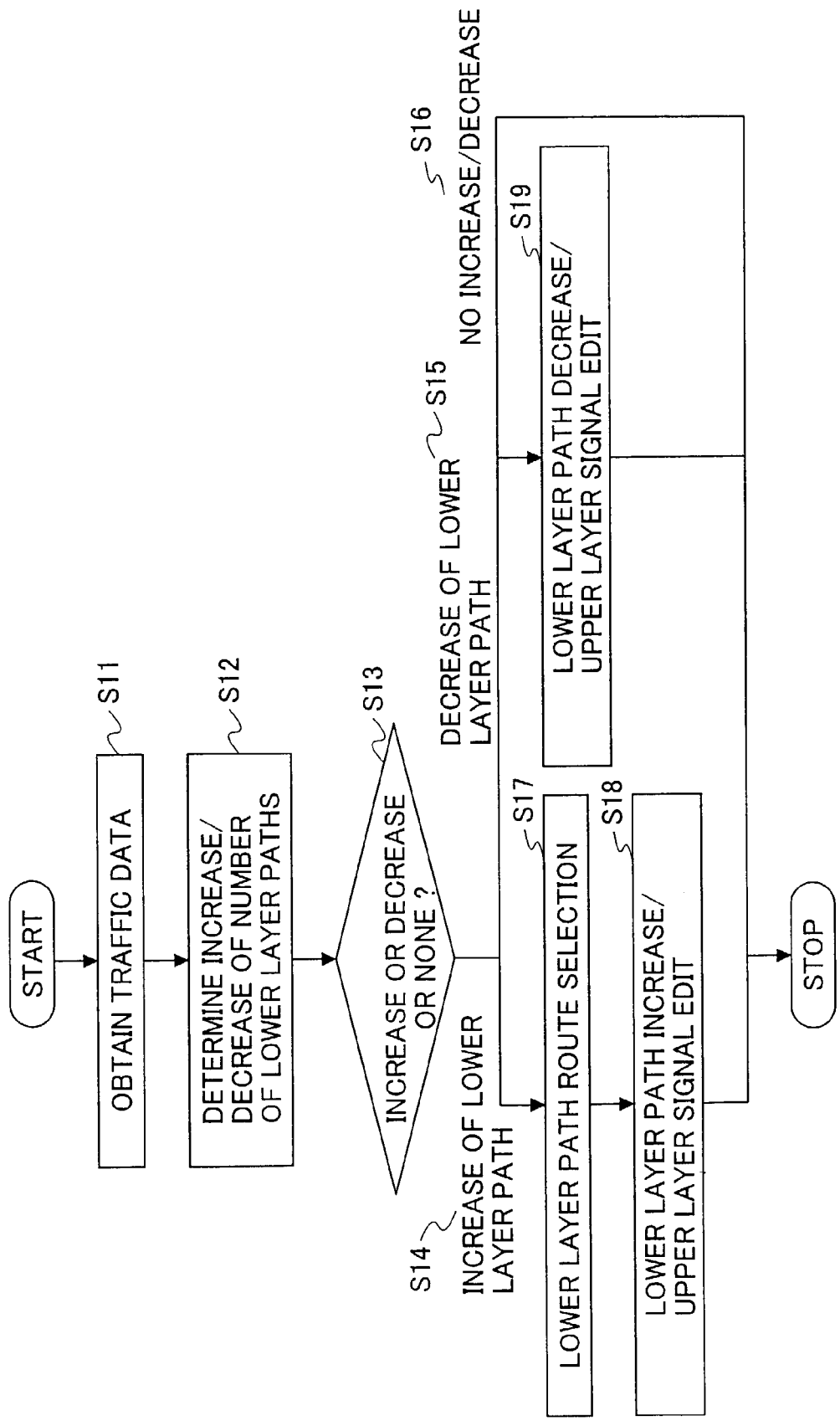
FIG. 20 is a flowchart showing the capacity variable link setting method of the eleventh embodiment in more detail than FIG. 19.

FIG. 20 is a flowchart showing the capacity variable link setting method of this embodiment in more detail than FIG. 19.

First, the start point node obtains traffic data indicating an amount of traffic from the start point node to the end point node in step 11. Then, by using the traffic data, the start point node makes a determination whether the number of the lower layer paths is insufficient for the amount of traffic of the upper layer, or the number of the lower layer paths is uselessly too large, or the number of the lower layer paths is appropriate in step 12.

On the basis of the determination, if the number of the lower layer paths is insufficient and it is necessary to increase the lower layer paths in the lower layer, it is determined to increase the number of the lower layer paths in step 14, and the increase of the lower layer paths is started. For increasing the lower layer paths, the route on which the lower layer paths to be increased is searched for in step 17.

According to the searched for route, the number of lower layer paths is increased, and the upper layer signal is edited in each of the start point and the end point of the lower layer path, such that the upper layer signal conforms to the number of the lower layer paths in step 18. Then, increase of the number of lower layer paths is complete.

According to the result of the determination, if the number of the lower layer paths is uselessly too large and it is necessary to decrease the lower layer paths, it is determined that the number of the lower layer paths is to be decreased in step 15. Then, decrease of the number of lower layer paths starts. For decreasing the lower layer paths, a lower layer path to be torn down is selected, and the lower layer path is torn down, and the upper layer signal is edited in step 19, so that decrease of lower layer paths is complete.

According to the result of the determination, if it is determined that the number of the lower layer paths is appropriate in step 16, the process ends. By repeating this procedure, capacity variable link setting can be performed.

Figure 21:
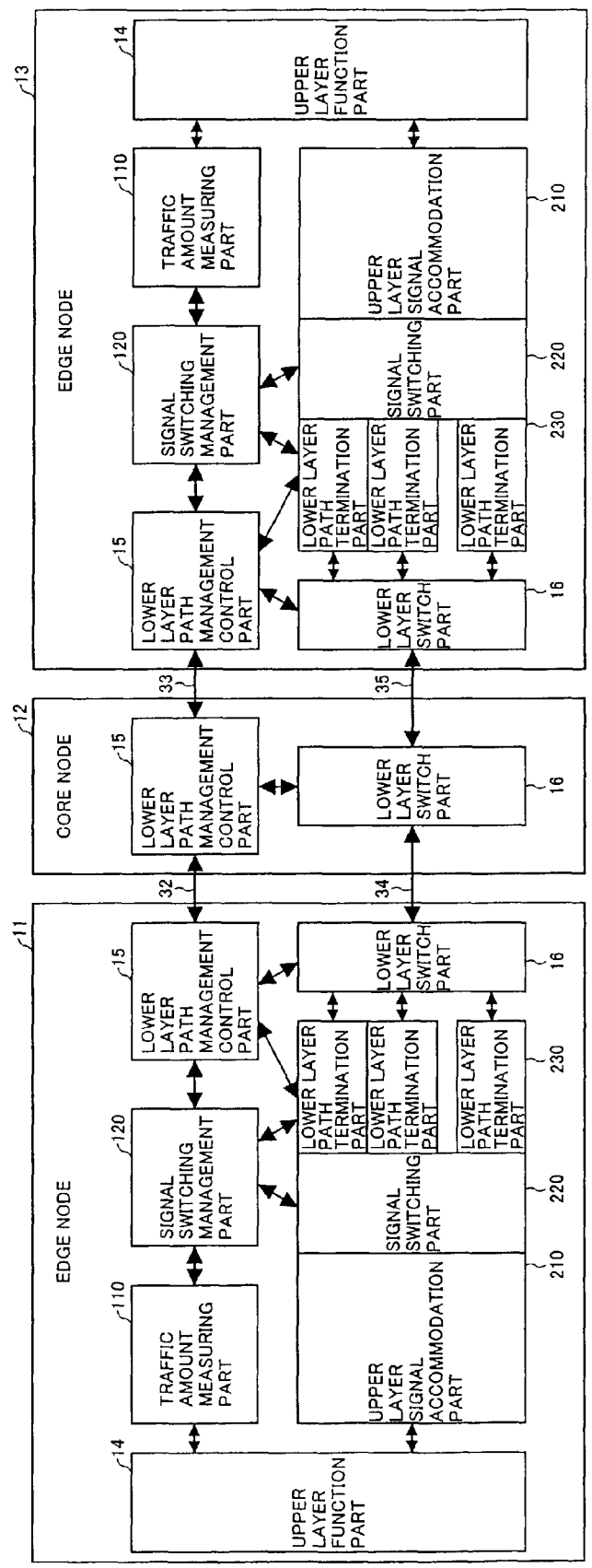
FIG. 21 shows a block diagram of a system in which the capacity variable link setting method of the eleventh embodiment is performed.

FIG. 21 shows a block diagram of a system in which the capacity variable link setting method of the eleventh embodiment is performed. The system shown in FIG. 21 includes two edge nodes 11 and 13, and one core node 12.

Each of the edge nodes 11 and 13 is a node located at the boundary between an upper layer network and a lower layer network. Each of the edge nodes includes a main signal system and a control system. The main signal system includes an upper layer function part 14 for processing an upper layer signal, an upper layer signal accommodation part 210 for accommodating the upper layer signal, a signal switching part 220 for editing the upper layer signal so as to send the signal to the lower layer, a lower layer path termination part 230 for terminating lower layer paths, and a lower layer switch part 16 for determining destinations of lower layer paths.

The control system includes a traffic amount measuring part 110 for measuring amount of traffic, obtaining traffic data, and determining increase or decrease the number of lower layer paths, a signal switching management part 120 for setting and managing the signal switching part 220, a lower layer path management control part 15 for managing and controlling the lower layer switch part 16 and lower layer paths. The lower layer switch part and the lower layer path management and control part will be referred to as a lower layer part.

The upper layer signal accommodation part 210, the signal switching part 220, the lower layer path termination part 230, the traffic amount measuring part 110 and the signal switching management part 120 correspond to the capacity variable link apparatus in the first to tenth embodiments. In the first to tenth embodiments, the lower layer switch part 16 and the lower layer path management and control part 15 are not shown. The signal switching management part 120 may include a function of the lower layer path management and control part 15.

The core node 12 is a node for performing processes of the lower layer in the lower layer network, and includes the lower layer part of the edge node. That is, the core node 12 includes the lower layer switch part 16 as the main signal system, and the lower layer management and control part 15 as a management and control system. Instead of using the core node 12, an edge node can be used in which only the lower layer part is used.

In the example of FIG. 21, one core node is provided. Alternatively, the core node may be excluded from the network, or more than one core node may be included according to the configuration of the network.

In this network configuration, main signal systems between nodes are connected by wavelength multiplexed transmission lines 34 and 35. That is, in this embodiment, an optical path using wavelength division multiplexing is used as the lower layer path.

The control signal systems are connected between nodes by using control signal transmission lines 32 and 33. The control signal transmission lines 32 and 33 may be a part of wavelength multiplexed transmission lines for the main signal systems, or may be of a specific network for management and control signals.

In this embodiment, for obtaining traffic data in the before-mentioned flowchart, traffic is observed in the upper layer function part 14 or the upper layer signal accommodation part 210 in the edge node, the traffic amount measuring part 110 obtains the observed amount of traffic, and stores the amount of traffic in a database as traffic data. The signal switching management part 120 obtains data necessary for making a determination of an increase or a decrease of the number of lower layer paths at a predetermined time interval or at any time. The database may be provided in the node, or the database may be provided in an external apparatus that is connected to the node via the network.

Figure 22:
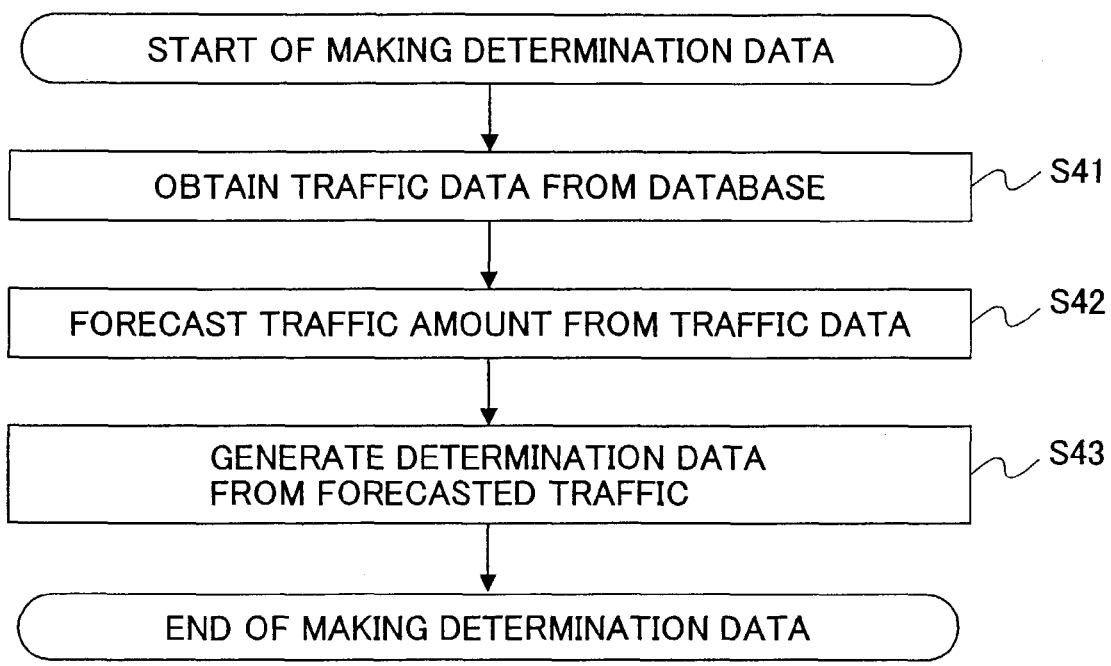
FIG. 22 is a flowchart showing a procedure for preparing determination data.

The traffic amount measuring part 110 makes determination data used for the determination of increase or decrease of the number of the lower layer paths by performing predetermined processes on the obtained traffic data. The determination data are made by extracting change characteristics of traffic from the obtained traffic data, and forecasting the future amount of traffic. The procedure for the forecast will be described with reference to the flowchart of FIG. 22.

The signal switching management part 120 obtains traffic data from the database in step 41, and forecasts the amount of traffic from the traffic data. For forecasting the amount of traffic, there are various methods. In this embodiment, the following forecast method is used.

For a plurality of pieces of traffic data of a time range, traffic variation with respect to time is approximated as a linear function by using the least squares approximation in which time is the variable. Then, from the linear function, the maximum value of the amount of traffic is obtained in a time range from the current time to a time for next determination of the number of the lower layer paths, so that the maximum value is determined to be the determination data.

In approximation, other than the linear function, nth order functions, and trigonometric functions, considering periodic variation of amount of traffic, can be used.

Figure 23:
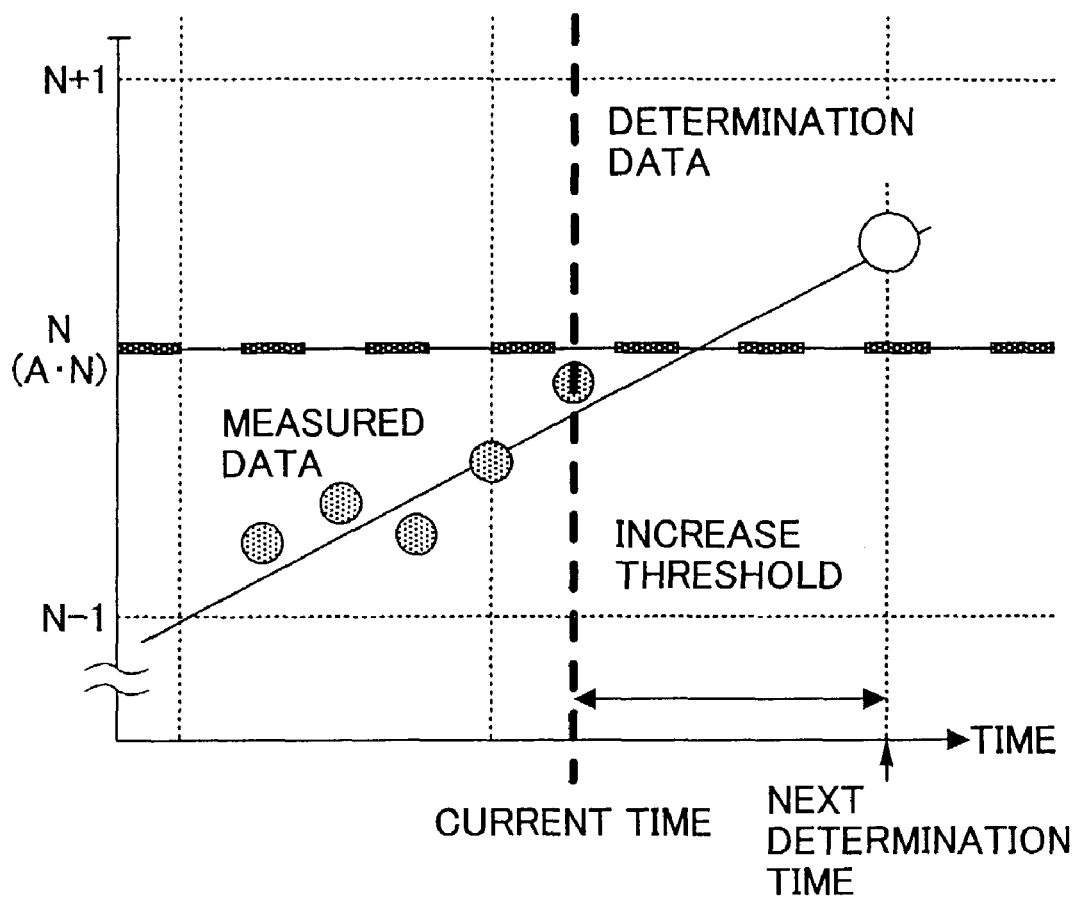
FIG. 23 shows an example for determining path increase or decrease by using linear approximation.

By comparing the determination data and a threshold that is a function of the number of current lower layer paths, it is determined whether the number of the lower layer paths is to be increased or decreased. In this embodiment, an increase threshold used for determining an increase of the number of lower layer paths and a decrease threshold used for determining a decrease of the number of the lower layer paths are used. For example, assuming that the number of current lower layer paths is N, N may be the increase threshold, and N−1 may be the decrease threshold. For comparing with the threshold, the determination data may be divided by the capacity of a lower layer path. An example of determination using the linear approximation is shown in FIG. 23.

If the determination data are larger than the increase threshold, the traffic amount measuring part 110 determines to increase the number of the lower layer paths, and determines the number of lower layer paths to be added. After that, the traffic amount measuring part 110 notifies the signal switching management part of the number. In the example shown in FIG. 23, one path is added as the increase.

When the determination data are smaller than the decrease threshold, the traffic amount measuring part 110 determines to decrease the number of the lower layer paths, and determines the number of lower layer paths to be decreased. After that, the traffic amount measuring part 110 notifies the signal switching management part of the lower layer paths to be decreased. If neither increase nor decrease is performed, the traffic amount measuring part 110 waits for the time of next determination.

Measurement of traffic and determination of increase or decrease of the number of lower layer paths are performed according to variation of traffic at a proper time interval or by being triggered by an occurrence of a predetermined event.

Figure 24:
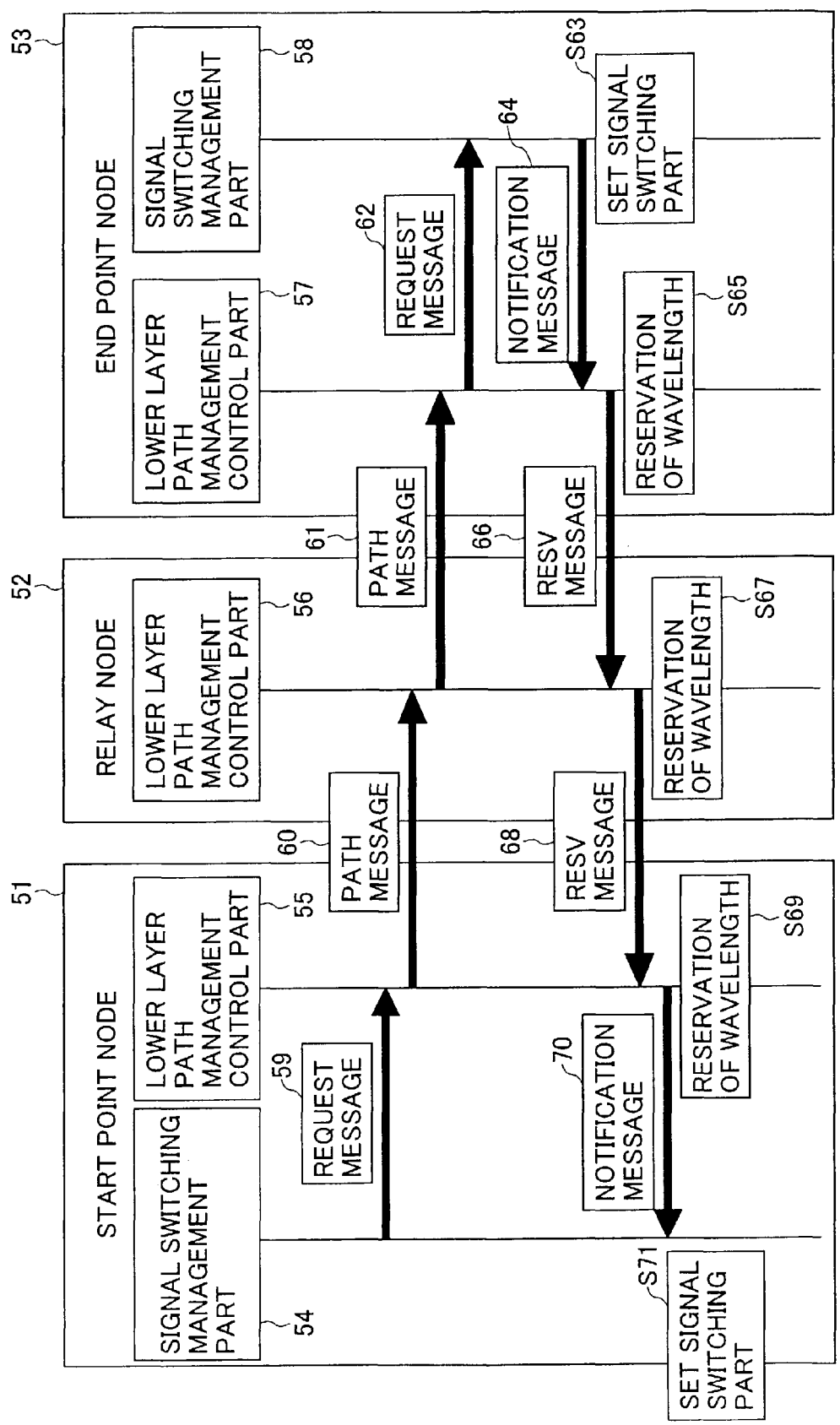
FIG. 24 shows a signaling sequence for increasing a lower layer path.

According to the result of the determination of increase or decrease of the number of lower layer paths, if it is determined that the number of lower layer paths is to be increased, the lower layer path is set up while communication is performed between nodes according to a signaling sequence shown in FIG. 24, and the signal switching part 220 is set.

Various protocols can be used for setting the lower layer path between nodes, such as RSVP-TE (Resource Reservation Protocol for Traffic Engineering), CR-LDP (Constraint-based Routing-Label Distribution Protocol), LDP (Label Distribution Protocol), and expanded protocols of these protocols. In this embodiment, expanded RSVP-TE is used for setting up the lower layer paths.

In the following, the signaling sequence used when increasing the number of lower layer paths shown in FIG. 24 will be described.

The signal switching management part 54 of the start point node 51 sends a lower layer path setting up request message 59 to the lower layer path management control part 55. The lower layer path setting up request message 59 includes information on the number of paths to be added, and an instruction to perform setting up processes for increasing the number of lower layer paths by using a protocol of the lower layer.

The lower layer path management and control part 55 that receives the request message performs a route search from the start point node to the end point node by using a route search protocol.

For the route search, a routing protocol such as OSPF (Open Shortest Path First), CSPF (Constrained Shortest Path First) and the like can be used.

On the basis of information on the route that is selected, the start point node sends an expanded Path message 60 to the relay node 52 via the control signal transmission line, in which the expanded Path message is expanded from the original Path message such that it includes information of the path to be increased. The network may not include the relay node, and may include more than one relay node. In this embodiment, one relay node 52 is provided between the start point node and the end point node.

When the relay node 52 receives the Path message 60, the lower layer path management and control part 56 searches for available wavelength. If there is available wavelength, the relay node 52 sends a Path message 61 to the end point node. When there are a plurality of relay nodes, each of the relay nodes receives the Path message and searches for available wavelength, and sends the Path message if there is available wavelength.

When the Path message 61 reaches the end point node 53 successfully, a lower layer path management and control part 57 sends a signal switching part setting request message 62 to the signal switching management part 58. Then, the signal switching part 220 is set in the end point node 53 in step 63. This request message 62 includes instructions for increasing the number of lower layer paths and connecting the upper layer signal accommodation part 210 and the lower layer paths.

When setting of the signal switching part 220 ends, the signal switching management part 58 returns a notification message 64 indicating completion of setting to the lower layer path management and control part 57.

After receiving the notification message 64, the lower layer path management and control part 57 reserves wavelength for setting up the lower layer path in step 65, and sends a Resv message 66 to the relay node along the same route as that of the Path message but in the reverse direction. When receiving the Resv message, the relay node reserves wavelength in step 66, and sends a Resv message 68 to the start point.

When there are a plurality of relay nodes, each relay node reserves wavelength when it receives the Resv message, and sends the Resv message to a next relay node.

When the start point node 51 receives a Resv message 68, the lower layer path management and control part reserves wavelength in step 69, and sends a notification message 70 to the signal switching management part.

When the signal switching management part 54 receives the notification message 70, the signal switching management part 54 sets the signal switching part 220 in step 71, so that the number of lower layer paths and capacity increase and the increasing of the number of lower layer paths is complete. The signal switching management part 54 may send an instruction to the signal switching part 220, so that the signal switching part 220 is set.

Figure 25:
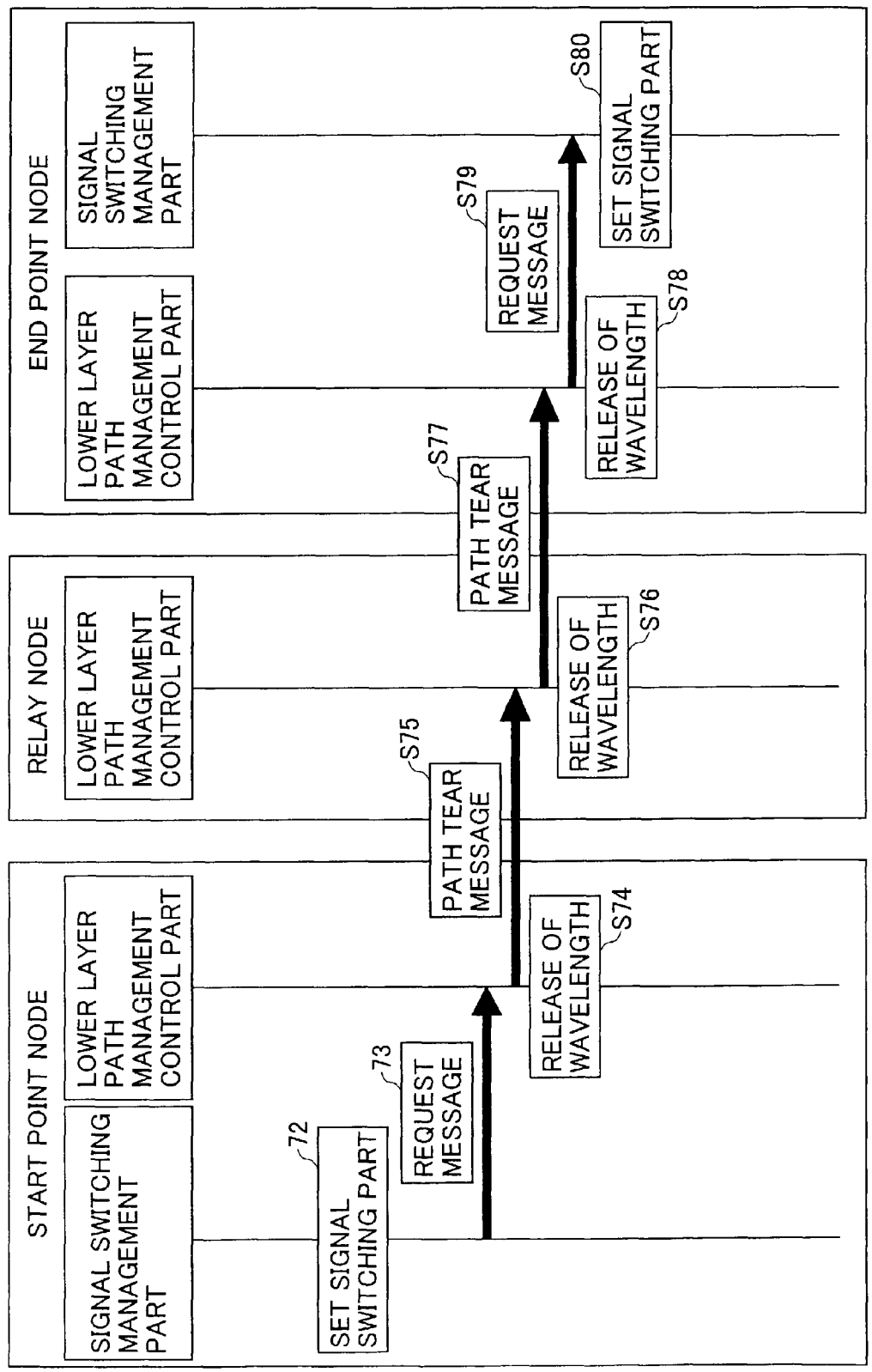
FIG. 25 shows a signaling sequence for decreasing a lower layer path.

According to the determination of increase or decrease of the number of lower layer paths, if it is determined that the number of the lower layer paths is to be decreased, communication between nodes is performed by a signaling sequence shown in FIG. 25, so that the number of lower layer paths can be decreased and the signal switching part 220 is set, and the number of the lower layer paths is decreased.

In the same way as the case of increase of the number of lower layer paths, various protocols can be used for setting up the lower layer paths between nodes, such as RSVP-TE (Resource Reservation Protocol for Traffic Engineering), CR-LDP (Constraint-based Routing-Label Distribution Protocol), LDP (Label Distribution Protocol), and expanded protocols of these protocols. In this embodiment, expanded RSVP-TE is used for setting up and tearing down lower layer paths.

In the following a sequence shown in FIG. 25 will be described. The configuration of the network including the start point node relay node and end point node is the same as that of FIG. 24.

The signal switching management part of the start point node performs setting of the signal switching part 220, so as to remove the lower layer path to be torn down, in step 72. Then, the signal switching management part sends a lower layer path tearing down request message 73 to the lower layer path management and control part. The request message 73 includes information on the path to be torn down and an instruction for performing processes for decreasing the number of lower layer paths by using a lower layer protocol.

When the lower layer path management and control part receives the request message 73, the lower layer path management and control part tears down the path and releases the wavelength in step 74, and sends a Path Tear message to the relay node in step 75.

When the relay node receives the Path Tear message, the lower layer path management control part tears down the path and releases the wavelength in step 76, and sends the Path Tear message to the next relay node in step 77.

When the Path Tear message reaches the lower layer path management and control part of the end point node, the lower layer path management and control part tears down the path and releases the wavelength in step 78, and sends a signal switching part setting request message to the signal switching management part in step 79. Then, the signal switching management part sets the signal switching part 220 of the end point node in step 80, so that tearing down of the lower layer path and capacity decrease because of the decrease of the number of the lower layer paths complete. The request message 79 includes an instruction for tearing down the path and disconnecting the upper layer signal accommodation part 210 and the lower layer path.

Figure 26:
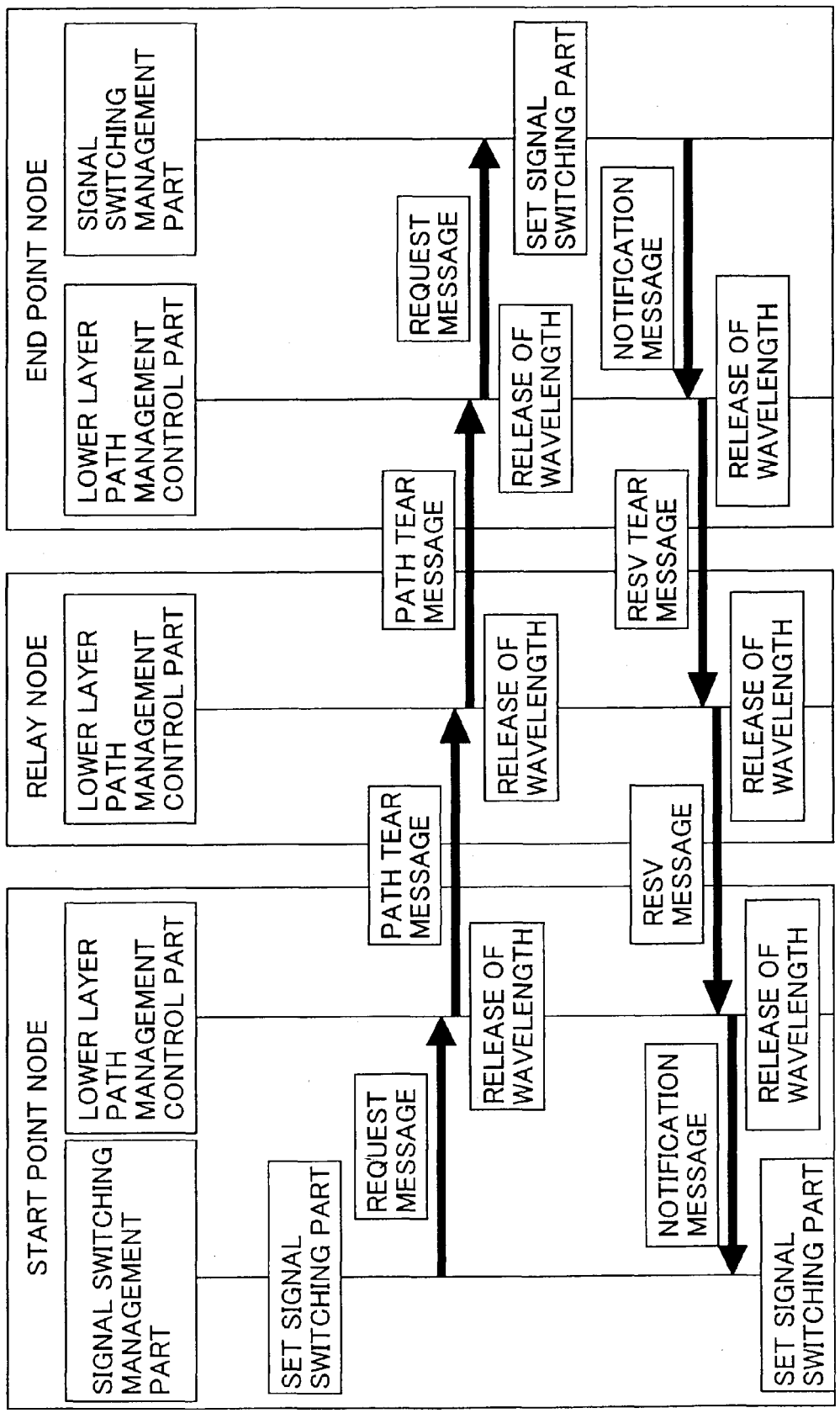
FIG. 26 shows a round trip signaling sequence for decreasing a lower layer path.

The decrease of the number of the lower layer paths can also be performed by using a round-trip signaling sequence shown in FIG. 26. In this case, after the end point node sets the signal switching part, the signal switching management part sends a notification message to the lower layer path management and control part. Then, the lower layer path management and control part releases the wavelength, and sends a Resv Tear message in the reverse direction. When the relay node receives the Resv Tear message, the relay node releases the wavelength, and sends the Resv Tear message to the start point node. When the start point node receives the Resv Tear message, the lower layer path management and control part releases the wavelength, and sends a notification message to the signal switching management part. When receiving the notification, the signal switching management part sets the signal switching part.

As mentioned above, adding and tearing down a path between the start point node and the end point node are performed by using a signaling protocol of the lower layer based on a protocol such as RSVP-TE (Resource Reservation Protocol for Traffic Engineering), CR-LDP (Constraint-based Routing-Label Distribution Protocol), LDP (Label Distribution Protocol). In this embodiment, when path setting up is performed by using the signaling protocol of the lower layer, the signal switching management part in the start point node sends a request message to the lower layer path management and control part, in which the request message includes information instructing adding or tearing down paths and information indicating increase amount or decrease amount. The request message triggers the lower layer path management and control part to launch a path setting up process based on a protocol of the lower layer, so that the lower layer path setting is started by the signaling protocol.

At the end point node, arrival of the signaling message based on the protocol of the lower layer triggers the lower layer path management and control part to send a request message to the signal switching management part, so that the signal switching management part sets the signal switching part 220.

In the above-mentioned process, expanded messages of protocols such as RSVP-TE (Resource Reservation Protocol for Traffic Engineering), CR-LDP (Constraint-based Routing-Label Distribution Protocol), and LDP (Label Distribution Protocol) are used. By expanding the message, information on bandwidth to be increased or decreased is reflected in bandwidth information of the signaling message of the above-mentioned protocols. In addition, the request message includes an instruction for setting up the lower layer path.

In the embodiment, the lower layer path is set up by using signaling between nodes. Instead of using the signaling, the lower layer paths may be set up by using a network operating system that manages the whole lower layer network, which network operating system issues instruction to each node. That is, the network operating system sends a lower layer path setting up message to each relay node, so as to set up the lower layer paths. In addition, the network operating system sends a request message for editing upper layer signals to each of the start point and end point nodes with the lower layer path setting up message.

According to this embodiment, the signaling message is expanded such that the request for decrease/increase of the number of lower layer paths includes information that is a trigger for performing editing of the upper layer signal. By expanding in this way, the signaling for increase or decrease of the number of lower layer paths and the signaling for editing the upper layer signal are integrated, and increase or decrease of the number of lower layer paths can be performed by one signaling. For realizing this signaling, a protocol expanded from an existing protocol such as RSVP-TE and the like can be used, such that control of upper layer and path setting up of lower layer are connected.

Twelfth Embodiment

Next, the twelfth embodiment will be described. In this embodiment, different from the before-mentioned eleventh embodiment, determination of increase or decrease of the number of lower layer paths is performed between the start point node and the end point node. Assuming that a path carrying traffic from the start point node to the end point node is an upward path, and a path carrying traffic from the end point node to the start point node is a downward path, a pair of the upward path and downward path is regarded as a lower layer path in this embodiment, and the number of the lower layer paths is increased or decreased. Accordingly, a lower layer path can be torn down while avoiding unnecessary loss of traffic.

Figure 27:
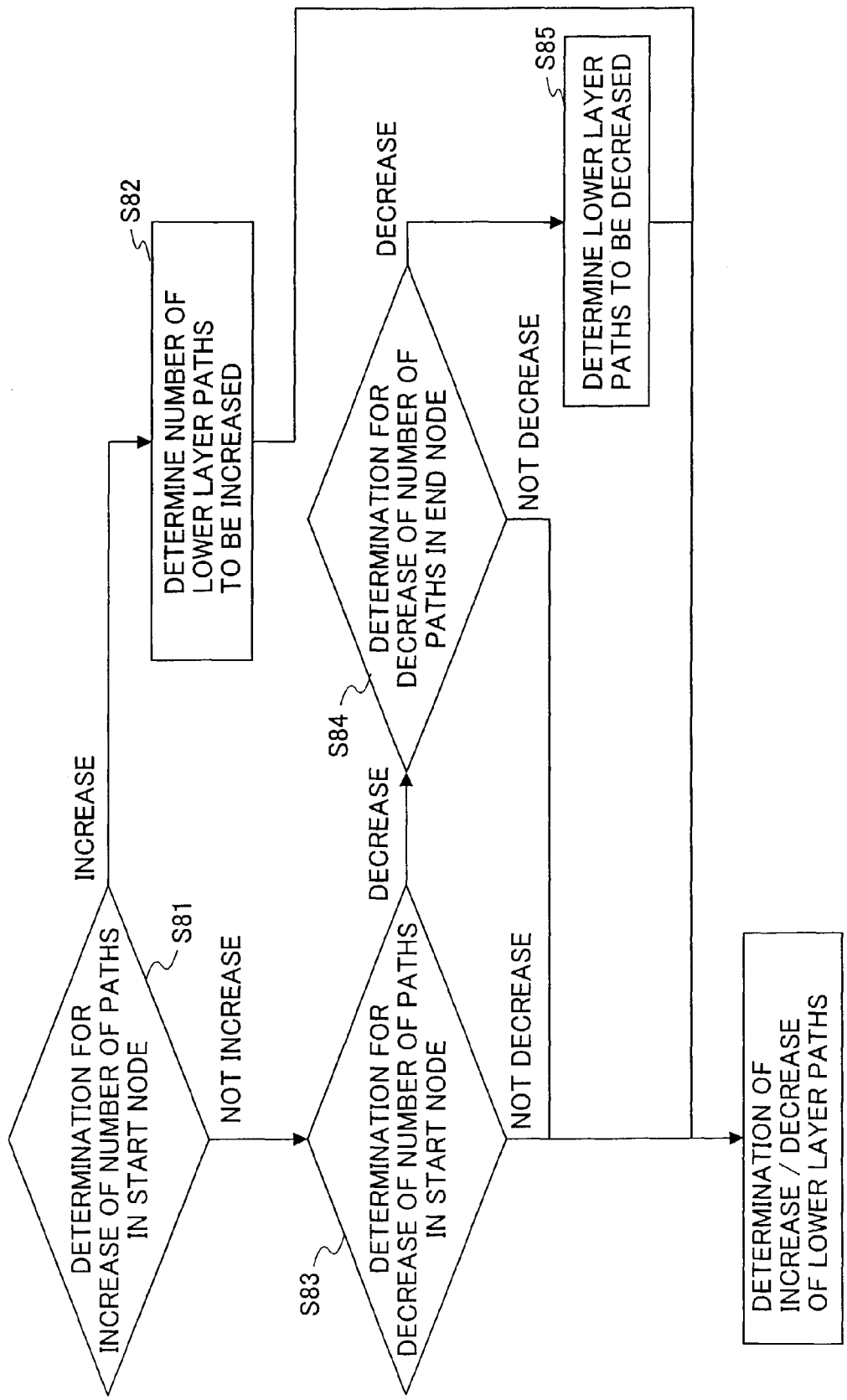
FIG. 27 is a flowchart for determining increase or decrease of the number of lower layer paths according to a twelfth embodiment of the present invention.

FIG. 27 is a flowchart showing a procedure for determining increase or decrease of the number of lower layer paths according to the twelfth embodiment of the present invention.

When determination of increase or decrease of the number of lower layer paths is started, first, a determination is made whether to increase the number of the lower layer paths in step 81. If it is determined that the number of lower layer paths is to be increased, the number to be added is determined in step 82. Then, the determination of increase or decrease of the number of lower layer paths is complete.

If it is not determined that the number of the lower layer paths is to be increased, a determination is made whether the number of the lower layer paths at the start point is to be decreased in step 83. If it is not determined that the number of the lower layer paths is to be decreased, the determination ends.

In step 83, if it is determined that the number of lower layer paths is to be decreased, a determination is made whether the number of the lower layer paths at the end point is to be decreased in step 84. If it is determined that the number of lower layer paths is to be decreased, the number to be decreased is determined in step 85. Then, the determination ends.

Figure 28:
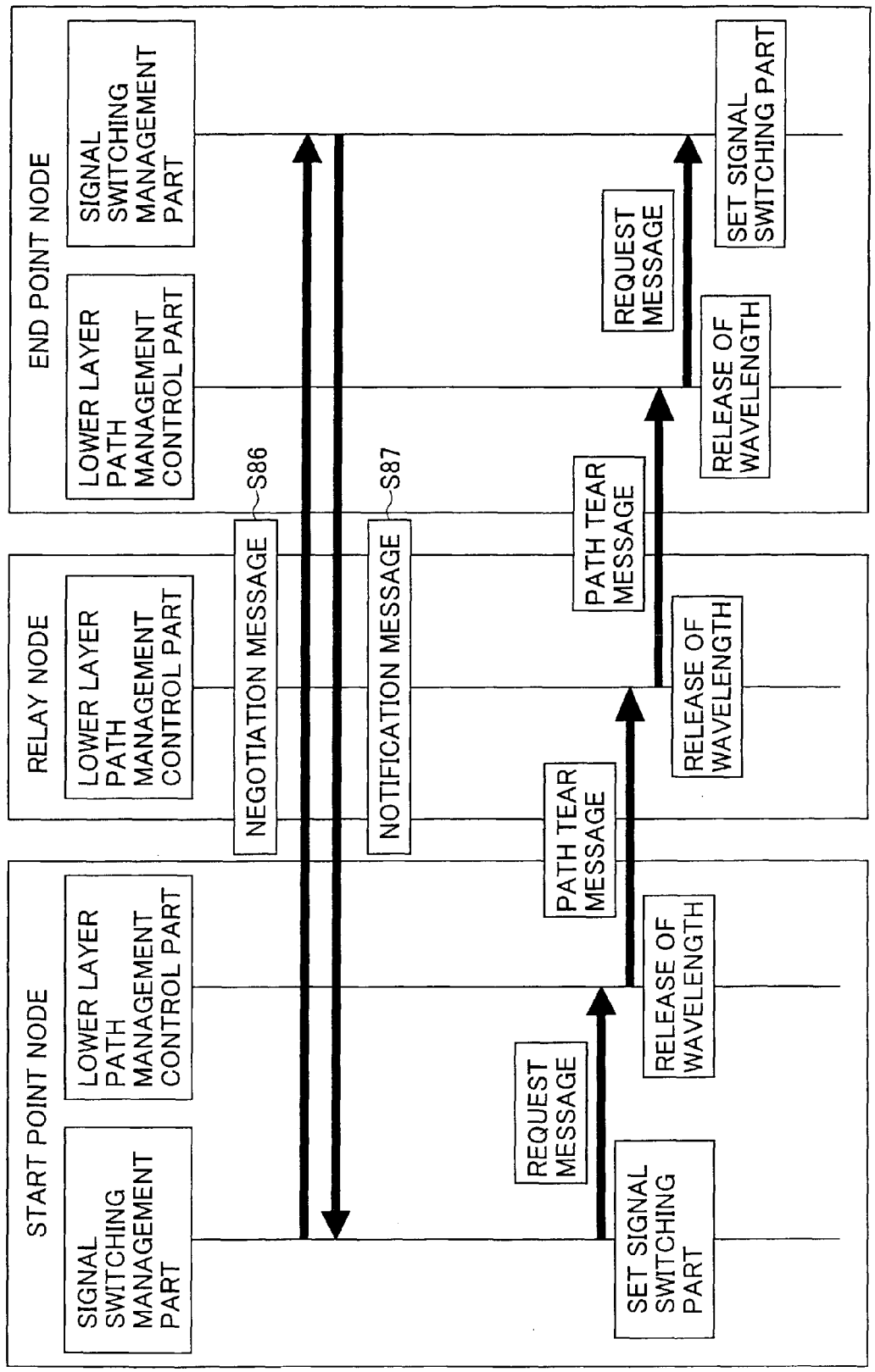
FIG. 28 shows a signaling sequence when the number of the lower layer paths is decreased according to the twelfth embodiment of the present invention.

Next, a signaling sequence for decreasing the number of lower layer paths will be described with reference to FIG. 28.

The start point node sends, to the end point, a negotiation message for making a determination of a decrease of the number of the lower layer paths at the end point in step 86. The end point makes a determination whether to decrease the number of paths according to the amount of traffic from the end point to the start point. The result is sent to the start node in step 87. On the basis of received result, the start node determines whether to decrease the number of lower layer paths. If it is determined that the number is to be decreased, the lower layer paths are decreased.

A method tearing down a lower layer path is the same as the method in the eleventh embodiment except for tearing down the pair of upward and downward pair of paths as a path.

Figure 29:
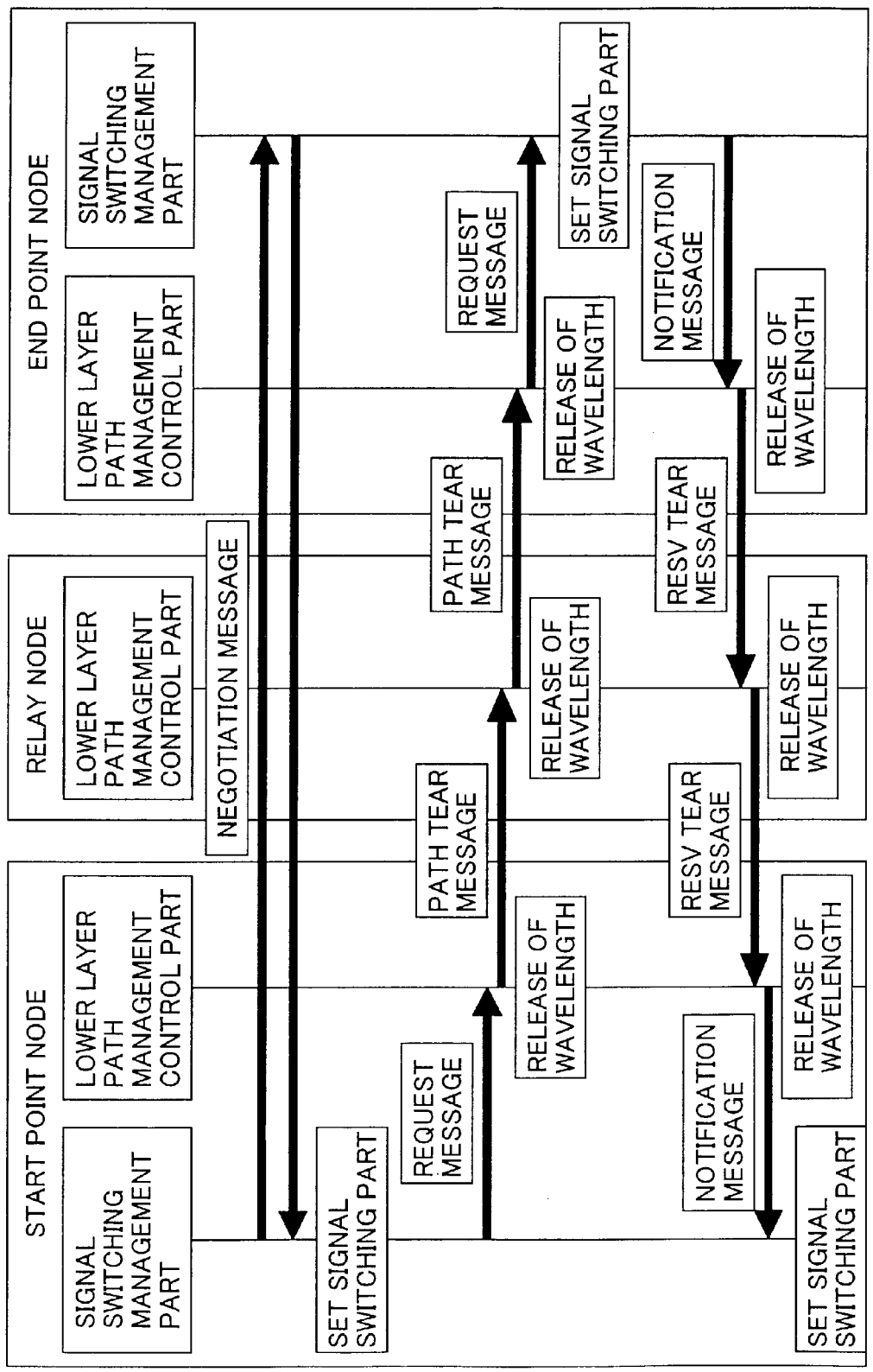
FIG. 29 shows a round trip signaling sequence when the number of the lower layer paths is decreased according to the twelfth embodiment of the present invention.

In the same way of FIG. 26 in the eleventh embodiment, also in the eleventh embodiment, a round-trip signaling sequence can be used as shown in FIG. 29.

The negotiation message is necessary when increasing or decreasing the number of lower layer paths is bi-directional and the traffic flowing in the path is asymmetrical. That is, if increase/decrease determination is performed only by observing traffic that flows into the start point node and flows from the start point node to the end point node, the lower layer path capacity may be deficient for traffic that flows into the end point node and flows from the end point node to the start point node, so that traffic loss may occur. Therefore, by using the negotiation message, determination of decrease of the number of paths is performed in consideration of the traffic that flows into the end point node and flows from the end point node to the start point node.

Instead of exchanging the message between the start point node and the end point node, the end point node spontaneously may send, to the start point node, a message including information of increase/decrease determination result in the end point node, and the start point node determines increase/decrease of the number of lower layer paths on the basis of the received determination result of the end point node and a determination result of the start point node. That is, increase or decrease of the number of lower layer paths is performed in consideration of two determination results of the end point node and the start point node.

Thirteenth Embodiment

In the following, the thirteenth embodiment of the present invention will be described.

The thirteenth embodiment shows that various networks can be used as the lower layer network and the upper layer network. For example, an optical transport network, an SDH network and the like can be used for the lower layer, and an IP network, a gigabit Ethernet, and a fibre channel network can be used as the upper layer network.

Figure 30:
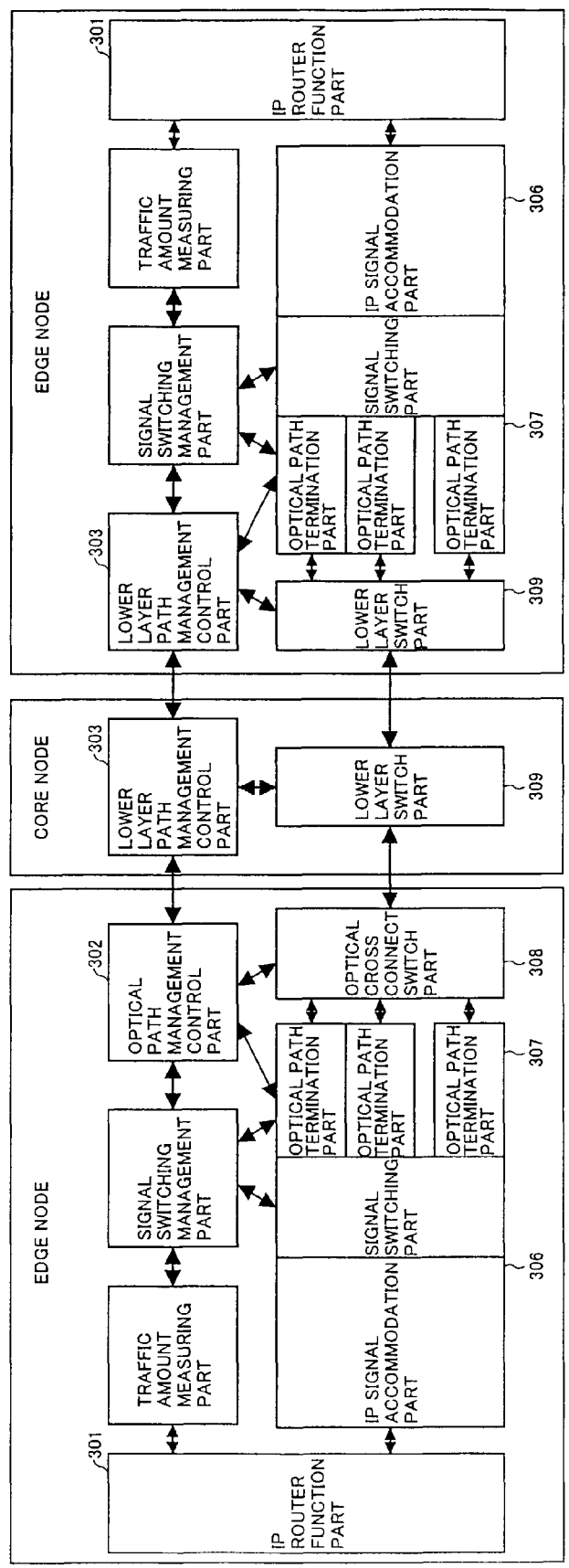
FIG. 30 shows an example of a node configuration and a network configuration when the lower layer network is an optical transport network, and the upper layer is an IP network according to the twelfth embodiment of the present invention.

FIG. 30 shows an example of a node configuration and a network configuration when the lower layer network is an optical transport network, and the upper layer is an IP network. In the configuration shown in FIG. 30, an IP router function part 301 is used for the upper layer function part 14 of FIG. 21, an IP signal accommodation part 306 is used for the upper layer signal accommodation part 210, an optical cross connect switch 308 is used for the lower layer switch part 16, and an optical path management and control part 302 is used for the lower layer path management and control part 15. Determination of increase or decrease of the number of optical paths can be performing by using the same procedure as that for determination of increase or decrease of the number of lower layer paths.

As mentioned above, according to the present invention, by measuring the amount of traffic of the upper layer signal having burst characteristics, a capacity variable link apparatus in which a mechanism for dynamically setting up/releasing lower layer network resources is realized. According to the capacity variable link apparatus, network resources can be used efficiently, so that investment can be decreased, and as a result, the communication rate can be lowered.

In addition, according to the present invention, when the traffic accommodated from the upper layer to the lower layer changes, the number of the lower layer paths can be changed according to the amount of traffic, so that the capacity of the lower layer network can be controlled. Accordingly, network resources in the lower layer can be used efficiently.

The signal switching part in the present invention can be realized by using any technology, such as by using an optical switch, an electrical switch and the like. However, especially, the effect of the present invention is larger when the signal switching part is realized by an electrical switch as opposed to an optical switch.

When editing the signals electrically, the relationship between the mapper and the lower layer paths shown in FIG. 15 is not only one-to-one, but also, it can be many-to-one. For example, even if the Ethernet signals include 10M/100M/1000M signals, the Ethernet signals can be edited such that they conform to the capacity of the lower layer paths (for example, 2.5 Gbit/s). On the other hand, for example, in the technology disclosed in Japanese laid-open patent application No.13-333045, since signals from the IP router enter a load distribution unit, the above-mentioned configuration cannot be realized. That is, signals including 10M/100M/1000M cannot be accommodated in an optical path (generally more than 2.5 Gbit/s) when using such a load distribution.

According to the embodiments of the present invention, instead of load distribution, editing is performed. Thus, the signals can be edited such that the signals conform to the capacity of the optical path. For example, when average speed of five gigabit Ethernets is 2.5 Gbit/s, the five signals can be edited so that the number of the lower layer paths is set to one or two according to the amount of traffic. This function cannot be realized, for example, by the technology disclosed in the Japanese laid-open patent application No.13-333045. In addition, according to the embodiments, the present invention has general versatility in that the upper layer signal can be edited even when the lower layer is a small unit such as radio, SDH and the like.

In addition, compared with the method using the optical cross connect switch in Japanese laid-open patent application No.13-333045, the embodiments of the present invention need fewer Optical/Electrical converters (O/Es). In the optical communication system, the parts of O/E and Electrical/Optical converter (E/O) are very expensive, thus, reduction of costs can be realized by using fewer O/Es according to the embodiments of the present invention. In addition, as the number of apparatuses to be manufactured increases, and as the scale of integration increases, costs for electrical circuit parts can be reduced. Thus, compared with the technology of the Japanese laid-open patent application No.13-333045, the cost for the apparatus of the embodiments of the present invention can be further reduced.

Further, by performing signal editing by using electrical circuits according to the embodiments of the present invention, the whole apparatus (including a part of the control system) can be integrated. This effect cannot be obtained by the technology of Japanese laid-open patent application No.13-333045. According to the configuration of an embodiment of the present invention, the size of the apparatus can be decreased by integration, and the costs can be reduced by decreasing manufacturing processes.

The present invention is not limited to the specifically disclosed embodiments, and variations and modifications may be made without departing from the scope of the present invention.

What is claimed is:

1. A capacity variable link apparatus including a main signal system and a control signal system, said main signal system comprising:
   an upper layer signal accommodation part for accommodating an upper layer signal;
   a lower layer path termination part;
   a signal switching part configured to divide said upper layer signal into lower layer signals in a lower layer path group having a capacity that is determined according to an amount of traffic of said upper layer signal, and configured to pass said lower layer signals to said lower layer path termination part;

said control system comprising:
   a traffic amount measuring part configured to measure said amount of traffic that flows in said upper layer signal accommodation part, and to determine whether the capacity of said lower layer path group is to be increased or decreased according to said amount of traffic;
   a signal switching management part configured to control said signal switching part according to the result of determination by said traffic amount measuring part; and
   a lower layer path management control part configured to exchange control messages for path setting and exchange control messages for path deletion with another capacity variable link apparatus placed on a route according to the increase or decrease of said capacity of said lower layer path group, the signal switching management part controlling, based on the control messages, the signal switching part to set the lower layer path group as a virtual concatenation path or a trunked logical link, wherein, when a control message is received from the other capacity variable link apparatus, the lower layer path management part sends a request message to the signal switching management part to cause the signal switching management part to create a setting for the signal switching part, and the signal switching part edits the upper layer signal into the lower layer path group based on the setting, and the control message sent from the capacity variable link apparatus to the other capacity variable link apparatus includes trigger information for the other capacity variable link apparatus to edit the upper layer signal into the lower layer path group as the virtual concatenation path or the trunked logical link.

2. The capacity variable link apparatus as claimed in claim 1, wherein said signal switching management part sends a request message including a request for setting up a lower layer path to a lower layer.

3. The capacity variable link apparatus as claimed in claim 1, wherein said traffic amount measuring part measures a throughput or a packet discarding ratio as a measuring parameter of said amount of traffic, compares the measured value with a threshold, and sends the result of comparing to said signal switching management part.

4. The capacity variable link apparatus as claimed in claim 3, wherein said traffic amount measuring part measures said measuring parameter for a predetermined time interval, calculates a mean value of measured values, and compares said mean value with a predetermined threshold.

5. The capacity variable link apparatus as claimed in claim 1, said capacity variable link apparatus further comprising means for accessing a network management operation system having a lower layer path network information database; and
   means for reading use status of network resources of a lower layer network managed by said network management operation system, and uploading information on increase or decrease of a lower layer path to said information database.

6. The capacity variable link apparatus as claimed in claim 5, wherein said network management operation system assigns priority to each lower layer path;
   said capacity variable link apparatus resolves contention between a lower layer path to be newly set up and a lower layer path that is already in use by referring to said priority.

7. The capacity variable link apparatus as claimed in claim 5, wherein said capacity variable link apparatus further includes a Generalized-MPLS protocol core for the lower layer; and
   said capacity variable link apparatus obtains use status of lower layer network resources managed by Generalized-MPLS protocol, and uploads information, to said information database, on increasing or decreasing of the capacity of said lower layer path group.

8. The capacity variable link apparatus as claimed in claim 7, wherein priority is assigned to each lower layer path that is managed by said Generalized-MPLS protocol core; and said capacity variable link apparatus resolves contention between a lower layer path to be newly set up and a lower layer path that is already in use by referring to said priority.

9. The capacity variable link apparatus as claimed in claim 8, wherein said priority of a lower layer path is set in a shim header.

10. The capacity variable link apparatus as claimed in claim 1, wherein said upper layer signal accommodation part is an Ethernet signal accommodation part for processing an Ethernet signal.

11. The capacity variable link apparatus as claimed in claim 10, said signal switching part comprising:
   an Ethernet switch configured to divide an Ethernet signal from said Ethernet signal accommodation part into signals whose capacity is determined according to an amount of traffic of said Ethernet signal from said Ethernet signal accommodation part; and
   means for mapping the divided signals to lower layer signals.

12. The capacity variable link apparatus as claimed in claim 10, said signal switching part comprising:
   means for mapping an Ethernet signal to a SONET signal; and
   a crosspoint switch configured to switch SONET signals whose bandwidth is determined according to an amount of traffic of said Ethernet signal.

13. The capacity variable link apparatus as claimed in claim 1, wherein said upper layer signal accommodation part is a fibre channel signal accommodation part for processing a fibre channel signal.

14. The capacity variable link apparatus as claimed in claim 1, wherein a label switch router for processing a label switch path of MPLS is used as said upper layer signal accommodation part and said signal switching part.

15. The capacity variable link apparatus as claimed in claim 1, wherein said lower layer link termination part is a SONET/SDH path termination part for terminating a STS/VC path in SONET/SDH.

16. The capacity variable link apparatus as claimed in claim 1, wherein said lower layer link termination part is an optical path termination part for terminating an optical path.

17. The capacity variable link apparatus as claimed in claim 16, wherein said optical path termination part is an OTN optical path termination part in conformity with ITU-T G.709.

18. The capacity variable link apparatus as claimed in claim 16, wherein said optical path termination part terminates an optical path to which a section overhead of an SDH signal in ITU-T G.707 is applied.

19. The capacity variable link apparatus as claimed in claim 1, wherein said lower layer path termination part is a radio path termination part for terminating a radio path in radio transmission.

20. A capacity variable link apparatus including a main signal system and a control signal system,
   said main signal system comprising:
   an upper layer signal accommodation part for accommodating an upper layer signal;
   a lower layer path termination part;
   a signal switching part for dividing said upper layer signal into lower layer signals in a lower layer path group having a capacity that is determined according to an amount of traffic of said upper layer signal, and passing said lower layer signals to said lower layer path termination part;
   said control system comprising:
   a traffic amount measuring part for measuring said amount of traffic that flows in said upper layer signal accommodation part, and determining whether the capacity of said lower layer path group is to be increased or decreased according to said amount of traffic;
   a signal switching management part for controlling said signal switching part according to the result of determination by said traffic amount measuring part; and
   a lower layer path management control part configured to exchange control messages for path setting and exchange control messages for path deletion with another capacity variable link apparatus placed on a route according to the increase or decrease of said capacity of said lower layer path group,
   wherein said traffic amount measuring part:
      obtains time-series traffic data,
      obtains the maximum value of a linear function, within a time range, that is an approximation of the change of said time-series traffic data, in which said time range is from a time when determination of increase or decrease of lower layer capacity is performed to a time when determination of increase or decrease of lower layer capacity is performed next, and
      determines whether the capacity of said lower layer path group is to be increased or to be decreased by comparing said maximum value with a predetermined threshold.

21. A capacity variable link apparatus including a main signal system and a control signal system,
   said main signal system comprising:
   an upper layer signal accommodation part for accommodating an upper layer signal;
   a lower layer path termination part;
   a signal switching part for dividing said upper layer signal into lower layer signals in a lower layer path group having a capacity that is determined according to an amount of traffic of said upper layer signal, and passing said lower layer signals to said lower layer path termination part;
   said control system comprising:
   a traffic amount measuring part for measuring said amount of traffic that flows in said upper layer signal accommodation part, and determining whether the capacity of said lower layer path group is to be increased or decreased according to said amount of traffic; and
   a signal switching management part for controlling said signal switching part according to the result of determination by said traffic amount measuring part,
   wherein said traffic amount measuring part:
   obtains time-series traffic data;
   obtains the maximum value of a linear function, within a time range, that is an approximation of the change of said time-series traffic data, in which said time range is from a time when determination of increase or decrease of lower layer capacity is performed to a time when determination of increase or decrease of lower layer capacity is performed next; and
   determines whether the capacity of said lower layer path group is to be increased or to be decreased by comparing said maximum value with a predetermined threshold.

* * * * *